(12) United States Patent
Kayano

(10) Patent No.: US 7,945,300 B2
(45) Date of Patent: May 17, 2011

(54) PLURAL CHANNEL SUPERCONDUCTING FILTER CIRCUIT HAVING RELEASE OF RESONANCE FREQUENCY DEGENERACY AND USABLE IN RADIO FREQUENCY EQUIPMENT

(75) Inventor: Hiroyuki Kayano, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/199,248

(22) Filed: Aug. 27, 2008

(65) Prior Publication Data

US 2009/0128261 A1    May 21, 2009

(30) Foreign Application Priority Data

Aug. 28, 2007   (JP) ................. 2007-220913

(51) Int. Cl.
   *H01P 1/20* (2006.01)
   *H01B 12/02* (2006.01)
(52) U.S. Cl. ............. 505/210; 333/99 S; 333/202
(58) Field of Classification Search .......... 333/176, 333/175, 202, 99 S; 505/210
   See application file for complete search history.

(56) References Cited

U.S. PATENT DOCUMENTS

| | | | |
|---|---|---|---|
| 5,815,052 A * | 9/1998 | Nakajima et al. | 333/175 |
| 6,107,898 A * | 8/2000 | Rauscher | 333/175 |
| 6,518,854 B2 | 2/2003 | Kayano et al. | |
| 7,295,090 B2 | 11/2007 | Kayano et al. | |
| 2004/0041635 A1 | 3/2004 | Sano et al. | |
| 2007/0001787 A1 | 1/2007 | Kayano | |
| 2008/0068113 A1 | 3/2008 | Kayano | |
| 2008/0139142 A1 | 6/2008 | Kayano et al. | |

FOREIGN PATENT DOCUMENTS

| | | |
|---|---|---|
| JP | 3380165 | 12/2002 |
| JP | 2006-14068 | 1/2006 |
| JP | 4264101 | 2/2009 |

OTHER PUBLICATIONS

Mitsuru Honjoh, et al., "Synthesis of Microwave Circuits by Normal Mode Expansion-Synthesis of Rectangular Waveguide Filter With dielectric Sheet Window", Technical Report of IEICE, MW 82-54, 1982, pp. 9-16.

Takayuki Kato et al. "Studies on the equivalent circuits of dual-mode rectangular waveguide filters using HFSS and MDS", Technical Report of IEICE, MW 98-85, 1998, pp. 73-80 (with English Abstract).

Masamitsu Nakajima, "Microwave Engineering—Basic Principles-,", Morikita Publishing Co., Ltd., Apr. 15, 1975, p. 55 and 1 additional page.

\* cited by examiner

*Primary Examiner* — Benny Lee
(74) *Attorney, Agent, or Firm* — Oblon, Spivak, McClelland, Maier & Neustadt, L.L.P.

(57) ABSTRACT

There is provided a signal processing method comprising: inputting an input signal having a certain band; dividing said input signal into a signal in a stop band and a signal in a pass band outside said stop band with a use of a band stop filter which has a center frequency of said input signal inside said stop band and includes a first resonator having said center frequency as a resonance frequency; extracting a signal in a desired band from the signal in said pass band with a use of a plurality of second resonators; decomposing the signal in said stop band into signals whose degeneracy of said resonance frequency are released; combining a degeneracy-released signals and the signal in said desired band to obtain a combined signal; and outputting the combined signal.

10 Claims, 22 Drawing Sheets

PLURAL CHANNEL SUPERCONDUCTING FILTER CIRCUIT HAVING RELEASE OF RESONANCE FREQUENCY DEGENERACY AND USABLE IN RADIO FREQUENCY EQUIPMENT

CROSS REFERENCE TO RELATED APPLICATIONS

This application is based upon and claims the benefit of priority from the prior Japanese Patent Applications No. 2007-220913, filed on Aug. 28, 2007; the entire contents of which are incorporated herein by reference.

BACKGROUND OF THE INVENTION

1. Field of the Invention

The present invention relates to a filter circuit, radio communication equipment and a signal processing method, and for example relates to a filter circuit for band limitation which is connected to a post stage of a power amplifier for use in a transmission unit of communication equipment using radio.

2. Related Art

Conventionally, as shown in FIG. 23, a filter circuit is configured by cascade-connecting resonators $1107(1)$, $1107(a)$, $1107(3)$, ... $1107(n)$. An equivalent circuit of each resonator is made up of an inductor and a capacitor, and is also added with a resistor in the case of considering an effect of a loss. A resonance frequency in the case of the resonator without the resistor is given by the following:

$$f_0 = (L \times C)^{-1/2}$$

where L and C are respectively an inductance and a capacitance of each resonator. In the filter circuit, resonators are cascade-connected, and inter-resonator coupling coefficients ($m_{12}$, $m_{23}$, ... , $m_{n-1,n}$ in FIG. 23) expressing coupling amounts of the respective resonators and an external Q (Qe in FIG. 23) value expressing an amount of exciting the resonators in each of input and output units are appropriately determined, so that a pass frequency range and a stop band attenuation amount as the filter circuit can be determined. Reference numeral 1101 denotes an input terminal, and reference numeral 1106 denotes an output terminal. In the filter circuit where the resonators are cascade-connected, a current is propagated from one resonator to another, resulting in flow of a current with all frequency components through the resonators. Therefore, in the case of constituting the resonators by the use of a material having a limit to a value of a current passable therethrough per unit area in a superconductive state, such as a superconductor, a power handling capability of each resonator is an important parameter for allowing large power to pass through the filter circuit, and hence studies have been conducted on a method of taking measures to prevent concentration of current flow on the resonator by application of a filled circle shape or a wide line so as to improve the power handling capability. However, there is a problem in that, since the external Q value is extremely high in the superconductive resonator, the current concentration is high and a large power handling capability cannot be obtained only by devising the shape of the resonator.

Meanwhile, as shown in FIG. 24, there is a method of connecting resonators in parallel to constitute a filter circuit as a method of dispersing power to each resonator in the filter circuit to realize a filter characteristic (JP-A 2001-345601 (Kokai), JP-A 2004-96399 (Kokai)). By such a parallel configuration of the resonators, inputted power is divided to each of the resonator $1108(1)$, $1108(2)$, ... $1108(n)$ so as to increase the power handling capability as a whole. The resonator is configured by constituting the resonators having different frequencies ($f_1$, $f_2$, ... $f_n$ in FIG. 24) and combining the resonators in parallel such that the resonators with adjacent resonance frequencies have mutually reversed phases, to realize the filter characteristic. In the figure, "–" in "–$m_2$" denotes reverse-phase coupling. There is a method of combining a superconductive filter with a normal conductive filter in a filter configuration formed using the above-mentioned configuration (U.S. Pat. No. 3,380,165, JP-A 11-186812 (Kokai)). In U.S. Pat. No. 3,380,165, the superconductive filter and the normal conductive filter are arranged in parallel, but there is a problem with this as follows. When large power is supplied to the input, as it is divided and inputted into the filters, the divided power is separated only into power to be reflected in and power to pass through each of the filters, and with this shape, the superconductive filter also requires a large power handling capability.

As thus described, it has hitherto been difficult to increase a power handling capability of a filter circuit using a superconductor with a steep transmission characteristic due to a characteristic of a critical current density of the superconductor.

SUMMARY OF THE INVENTION

According to an aspect of the present invention, there is provided with a filter circuit, comprising:

an input terminal configured to input an input signal having a certain band;

a first four-port element configured to receive the input signal in a terminal A, divide and transmit a received signal from a terminal B and a terminal C, and combine and transmit signals given to the terminal B and the terminal C into a combined signal from a terminal D;

a first band stop filter configured to have a center frequency of the input signal inside a stop band, reflect a signal in the stop band out of the signal transmitted from the terminal B back to the terminal B while allowing a signal in a pass band outside the stop band to pass, and include a resonator having the center frequency as a resonance frequency;

a second band stop filter configured to have a stop band identical to the stop band of the first band stop filter, reflect a signal in the stop band out of the signal transmitted from the terminal C back to the terminal C while allowing a signal in the pass band to pass, and include a resonator having the center frequency as a resonance frequency;

a first resonator circuit configured to extract a signal in a desired band from the signal in the pass band, which passed through the first band stop filter, with a use of a plurality of first resonators;

a second resonator circuit configured to extract a signal in a band identical to the desired band from the signal in the pass band, which passed through the second band stop filter, with a use of a plurality of second resonators having the same resonance frequency as each of the first resonators;

a second four-port element configured to receive in a terminal E a combined signal in the stop band which has reflected on the first and second band stop filters and combined in first four-port element from the terminal D, and divide and transmit a received signal from a terminal F and a terminal G, and combine and transmit signals given to the terminal F and the terminal G into a combined signal from a terminal H;

a third band stop filter configured to have a stop band identical to the stop band of the first band stop filter, allows the signal in the desired band which has extracted at the first resonator circuit to pass to the terminal F, and reflect the signal in the stop band transmitted from the terminal F back to the terminal F;

a fourth band stop filter configured to have a stop band identical to the stop band of the first band stop filter, allow the signal in the desired band which has extracted at the second resonator circuit to pass to the terminal G, and reflect the signal in the stop band transmitted from the terminal G back to the terminal G;

an output terminal configured to receive the combined signal into which the signals in the desired band are combined and the combined signal into which the signals in the stop band are combined at same time from the terminal H, respectively to obtain an output signal, and output the output signal; and a resonator-coupled circuit placed on a transmission line from the terminal D of the first four-port element to the terminal E of the second four-port element, which couples the resonators of the first and second band stop filters with the resonators of the third and fourth band stop filters through the transmission line so as to release degeneracy of the resonators of the first and second band stop filters.

According to an aspect of the present invention, there is provided with a radio communication equipment comprising:

a signal processing circuit configured to perform transmission processing on transmission data to obtain a transmission signal;

a power amplifier configured to amplify the transmission signal;

a filter circuit configured to perform filter processing on an amplified signal; and an antenna configured to radiate a signal obtained by the filter circuit to a space as a radio wave, wherein the filter circuit has an input terminal configured to input the amplified signal, a first four-port element configured to receive an input signal in a terminal A, divide and transmit a received signal from a terminal B and a terminal C, and combine and transmit signals given to the terminal B and the terminal C into a combined signal from a terminal D;

a first band stop filter configured to have a center frequency of the input signal inside a stop band, reflect a signal in the stop band out of the signal transmitted from the terminal B back to the terminal B while allowing a signal in a pass band outside the stop band to pass, and include a resonator having the center frequency as a resonance frequency;

a second band stop filter configured to have a stop band identical to the stop band of the first band stop filter, reflect a signal in the stop band out of the signal transmitted from the terminal C back to the terminal C while allowing a signal in the pass band to pass, and include a resonator having the center frequency as a resonance frequency;

a first resonator circuit configured to extract a signal in a desired band from the signal in the pass band, which passed through the first band stop filter, with a use of a plurality of first resonators;

a second resonator circuit configured to extract a signal in a band identical to the desired band from the signal in the pass band, which passed through the second band stop filter, with a use of a plurality of second resonators having the same resonance frequency as each of the first resonators;

a second four-port element configured to receive in a terminal E a combined signal in the stop band which has reflected on the first and second band stop filters and combined in the first four-port element from the terminal D, and divide and transmit a received signal from a terminal F and a terminal G, and combine and transmit signals given to the terminal F and the terminal G into a combined signal from a terminal H;

a third band stop filter configured to have a stop band identical to the stop band of the first band stop filter, allows the signal in the desired band which has extracted at the first resonator circuit to pass to the terminal F, and reflect the signal in the stop band transmitted from the terminal F back to the terminal F;

a fourth band stop filter configured to have a stop band identical to the stop band of the first band stop filter, allow the signal in the desired band which has extracted at the second resonator circuit to pass to the terminal G, and reflect the signal in the stop band transmitted from the terminal G back to the terminal G;

an output terminal configured to receive the combined signal into which the signals in the desired band are combined and the combined signal into which the signals in the stop band are combined at same time from the terminal H, respectively to obtain an output signal, and output the output signal; and a resonator-coupled circuit placed on a transmission line from the terminal D of the first four-port element to the terminal E of the second four-port element, which couples the resonators of the first and second band stop filters with the resonators of the third and fourth band stop filters through the transmission line so as to release degeneracy of the resonators of the first and second band stop filters.

According to an aspect of the present invention, there is provided with a signal processing method comprising:

inputting an input signal having a certain band;

dividing the input signal into a signal in a stop band and a signal in a pass band outside the stop band with a use of a band stop filter which has a center frequency of the input signal inside the stop band and includes a first resonator having the center frequency as a resonance frequency;

extracting a signal in a desired band from the signal in the pass band with a use of a plurality of second resonators;

decomposing the signal in the stop band into signals of the released resonance frequency degeneracy;

combining a degeneracy-released signals and the signal in the desired band to obtain a combined signal; and outputting the combined signal.

DETAILED DESCRIPTION OF THE INVENTION

In the figures, features which are similar may be designated by the same reference labels among figures and are not necessarily described in detail for each of the drawings in which they appear.

Figure 1:
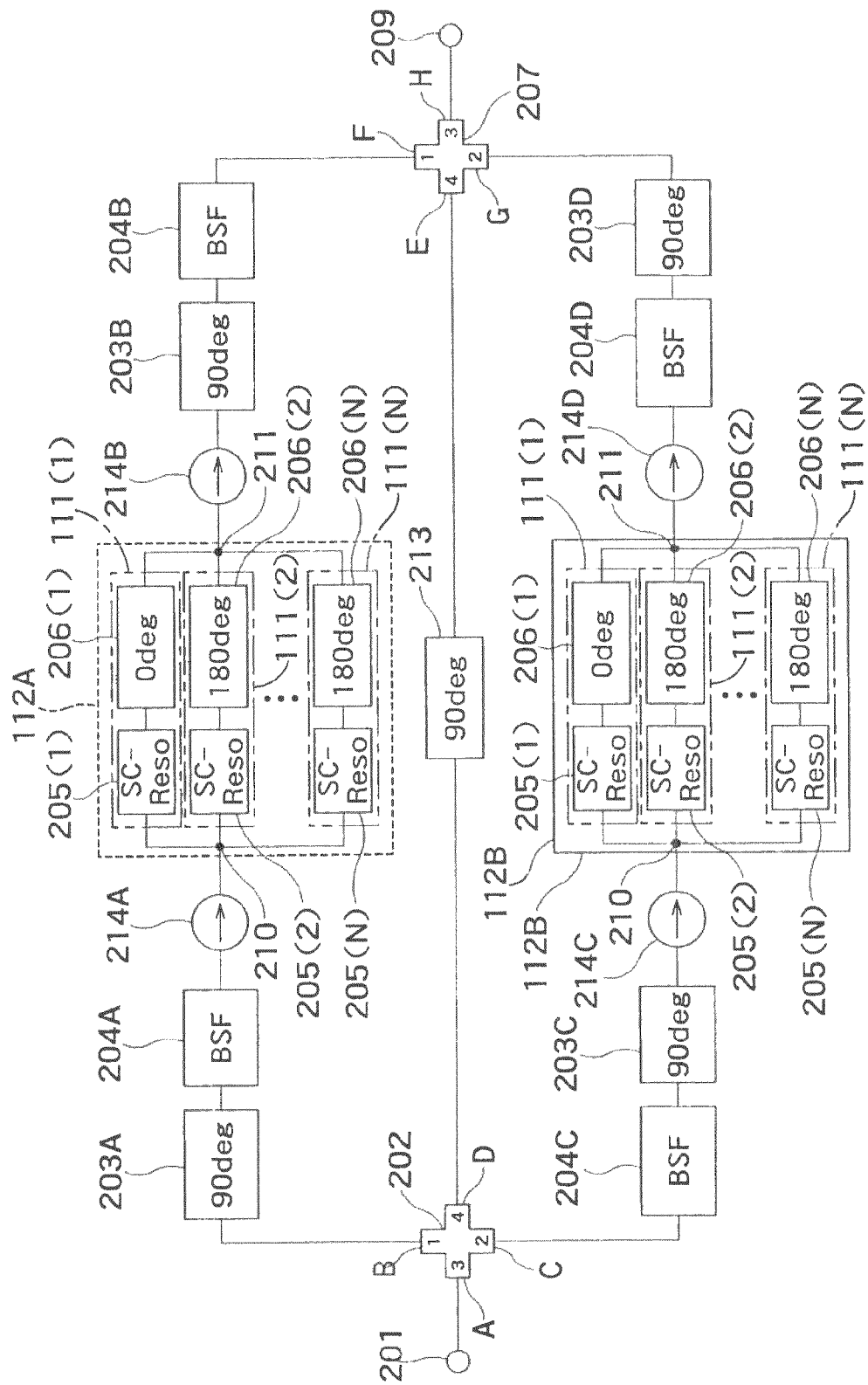
FIG. 1 is a circuit diagram showing a first embodiment of a filter circuit of the present invention.

FIG. 1 shows a first embodiment of a filter circuit according to the present invention.

A filter circuit of the present embodiment divides a signal, which has a certain band and was inputted into an input terminal 201, with the use of a band stop filter into a signal (with a large power density) in a stop band and a signal (with a small power density) in a pass band outside the stop band, extracts a signal in a desired band from the signals in the pass band with the use of a resonator circuit including a plurality of superconductive resonators, and combines the extracted signal in the desired band with the signal in the stop band, to output the signal from an output terminal 209.

In the present filter circuit, four-port elements 202 and 207 having an S parameter defined in the following formula are used. Respective terminals of the four-port elements 202 and 207 are defined as terminals 1, 2, 3, and to 4.

$$[S] = \frac{1}{\sqrt{2}} \begin{bmatrix} 0 & 0 & 1 & 1 \\ 0 & 0 & -1 & 1 \\ 1 & -1 & 0 & 0 \\ 1 & 1 & 0 & 0 \end{bmatrix}$$

Figure 2:
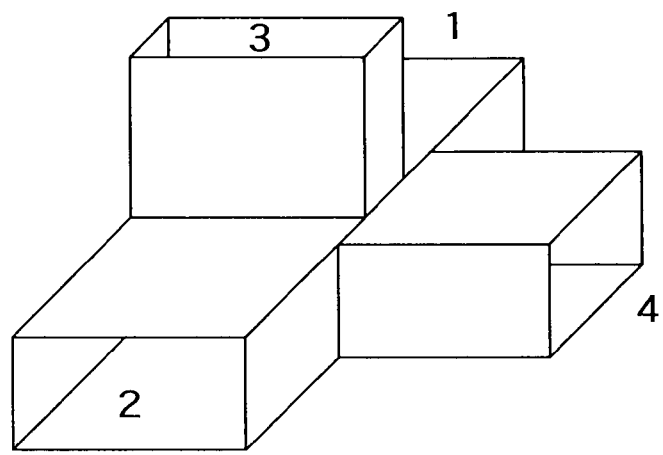
FIG. 2 is an image diagram of a four-port element using a wave guide tube.
Figure 3:
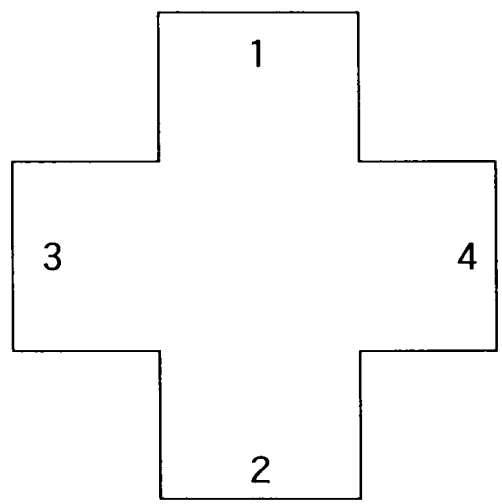
FIG. 3 is a view showing terminal numbers of the four-port element.
Figure 4:
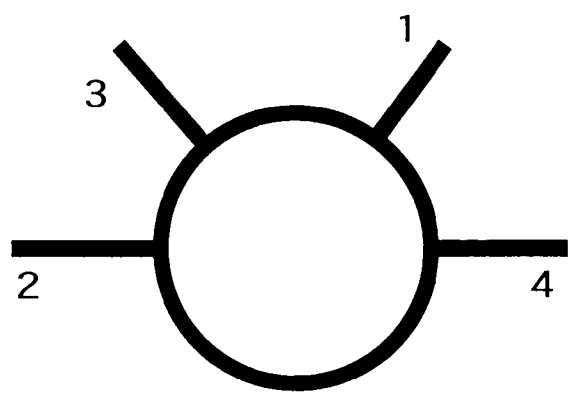
FIG. 4 is an image diagram showing a four-port element using a micro-strip line.

Examples of the four-port element may include magic T using a wave guide tube shown in FIG. 2. FIG. 3 shows the four-port element described in the circuit diagram of FIG. 1 having been taken out. The same numbers in FIGS. 2 and 3 correspond to each other. Further, examples of the four-port element using a transmission line (microstrip line) may include a rat-race circuit as shown in FIG. 4.

In the example of FIG. 1, a terminal 3 of the four-port element 202 corresponds to the terminal A, a terminal 1 corresponds to the terminal B, a terminal 2 corresponds to the terminal C, and a terminal 4 corresponds to the terminal D. A terminal 4 of the four-port element 207 corresponds to the terminal E, a terminal 1 corresponds to the terminal F, a terminal 2 corresponds to the terminal G, and a terminal 3 corresponds to the terminal H.

In FIG. 1, an input terminal 201 is connected to the terminal 3 on the input side of the four-port element 202, and the terminal 4 of the four-port element 202 is connected to the terminal 4 of the four-port element 207 through a 90-degree delay circuit 213 as one of significant characteristics of the present embodiment. A delay amount of the delay circuit 213 is not limited to 90 degrees, and can take an arbitrary value so long as satisfying 90±45±±180×n degrees (n is an integer not smaller than 0). The delay circuit 213 corresponds, for example, to a resonator-coupled circuit. The terminal 3 of the four-port element 207 is connected to an output terminal 209.

Between the terminal 1 of the four-port element 202 and the terminal 1 of the four-port element 207, a 90-degree delay circuit 203A, a band stop filter (BSF: Band Stop Filter) 204A, an isolator 214A, a resonator circuit 112A, an isolator 214B, a 90-degree delay circuit 203B, and a band stop filter (BSF) 204B are cascade-connected. Further, between the terminal 2 of the four-port element 202 and the terminal 2 of the four-port element 207, a band stop filter (BSF) 204C, a 90-degree delay circuit 203C, an isolator 214C, a resonator circuit 112B, an isolator 214D, a band stop filter (BSF) 204D, and a 90-degree delay circuit 203D are cascade-connected.

Each of the band stop filters 204A, 204B, 204C, and 204D has a power handling capability Wbsf(W) and frequencies fbsf1, fbsf2 (fbsf1<fbsf2) at two points, which determine a 3 dB band width of a return loss characteristic as a stop band. The stop band of each of the band stop filters 204A, 204B, 204C, and 204D includes a center frequency of the present filter circuit or a center frequency of a signal inputted into an input terminal 201, and a resonator where the center frequency is a resonance frequency (cf. later-described FIG. 7). Each of the band stop filters 204A, 204B, 204C and 204D reflects a signal in the stop band and allows a signal in a band outside the stop band (pass band) to pass. Each of the band stop filters 204A, 204B, 204C and 204D has the same stop band.

Each of the resonator circuits 112A and 112B has the same configuration. In each resonator circuit, blocks 111(1), 111(2), . . . 111(N) each having a single resonator with a different frequency are connected in parallel. Each resonator circuit has a power divider 210 that divides an inputted signal and gives the divided signal to each block, and a power combining unit 211 that combines an output signal in each block.

Each block 111(N) (N=1, 2, . . . ) has a resonator 205(N) composed of a superconductor (SC) and a power handling capacity amount not larger than Wreso(W), and a delay circuit 206(N) cascade-connected to the resonator 205(N).

A resonance frequency freso-i ("i" is not smaller than 1 and not larger than "N") of each resonator 205(N) differs. Each delay circuit 206(N) is provided such that at the time of power combining in the power combining unit 211, signals having adjacent resonance frequencies satisfy a phase difference (reverse phase) condition in the range of 180+360×k±30 degrees ("k" is an integer not smaller than 0), thereby to obtain combining of a sum of the signals having adjacent resonance frequencies at the time of power combining. The sum combining is described using FIGS. 5A, 5B, 6A, and 6B.

Figure 5A:
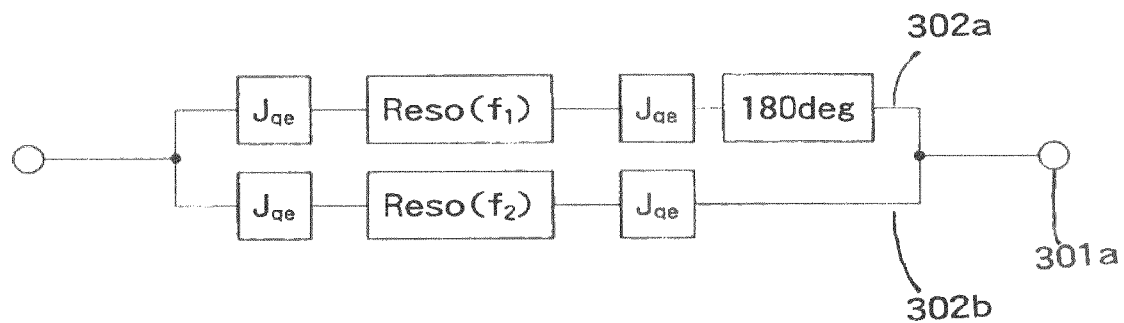
FIGS. 5A and 5B are views explaining sum combining.
Figure 5B:
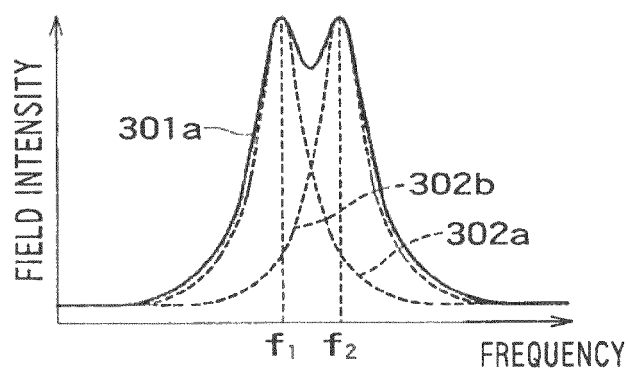

As shown in FIG. 5A, in the parallel connection type resonator, in combining signals having passed through two resonators Reso($f_1$) and Reso($f_2$), with corresponding resonance frequencies f1 and f2, when these signals are combined so as to have a 180-degree phase difference, an obtained signal 301a is combining of a sum of two signals (resonant waveform) 302a and 302b, as shown in FIG. 5B. Adjusting an external circuit coupling coefficient Jqe allows configuration of a band pass filter.

Figure 6A:
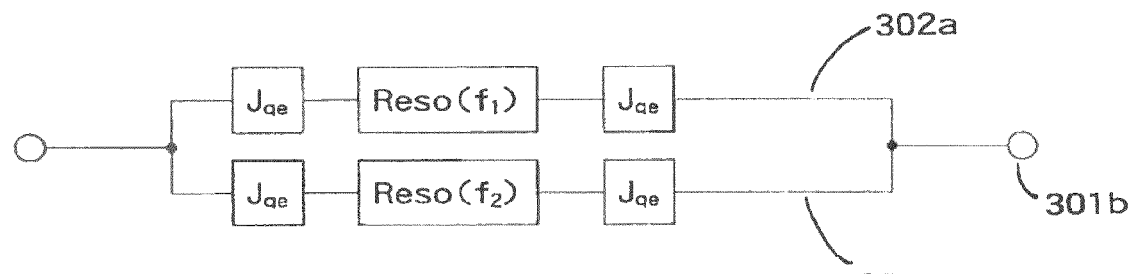
FIGS. 6A and 6B are views explaining difference combining.
Figure 6B:
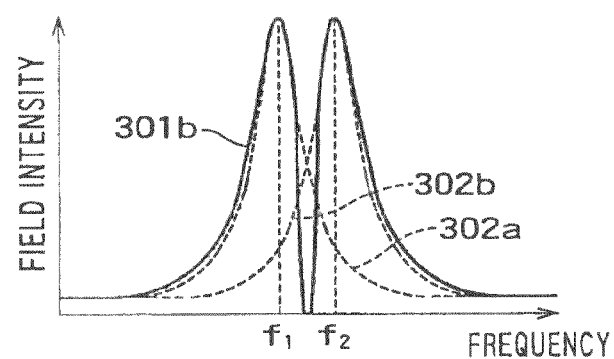

On the other hand, as shown in FIG. 6A, when signals having passed the two resonators Reso($f_1$) and Reso($f_2$), with corresponding resonance frequencies f1 and f2 are combined so as to have a 0-degree phase difference, an obtained signal 301b is a combining of a difference between the two signals (resonant waveform) 302a and 302b, as shown in FIG. 6B.

Therefore, in the filter circuit in FIG. 1, signals that pass between the adjacent blocks are made to have a 180-degree phase difference so as to obtain the sum combining in the power combining unit 211. Here, numerical values (0 degree and 180 degrees) of the delay circuit 206(N) are an example and other values can also be used. Further, even when the sequence of the resonator 205(N) and the delay circuit 206(N) is inverted, a similar characteristic can be obtained.

The relation between the power handling capability Wbsf of each of the band stop filters 204A, 204B, 204C, and 204D and the power handling capability Wreso of each resonator 205(N) is: Wbsf>Wreso. Further, the relation between the frequencies fbsf1 and fbsf2 (fbsf1<fbsf2) at two points that determine the 3 dB band width of the return loss characteristic of each of the band stop filters 204A, 204B, 204C, and 204D and the resonance frequency freso-i ("i" is not smaller than 1 and not larger than "N") of each resonator is: freso-i<fbsf1 or fbsf2<freso-i. Namely, each resonator has a resonance frequency in the pass band of the band stop filter, and each of the resonator circuits 112A and 112B extracts a signal in the desired band from signals in the pass band of the band stop filter. The desired band is, for example, a band adjacent to the stop band among the pass band.

In FIG. 1, the isolator 214A allows a signal to pass in one direction from the band stop filter 204A toward the resonator circuit 112A, and the isolator 214B allows a signal to pass in one direction from the resonator circuit 112A to the band stop filter 204B, to prevent coupling of the resonator of the band stop filter 204A with the resonator of the band stop filter 204B on the transmission line through the resonator circuit 112A. Further, the isolator 214A also serves to absorb a signal that passes through the band stop filter 204A and is reflected on the resonator circuit 112A (i.e. a signal outside the filter band of the filter circuit). Moreover, the isolator 214B also serves to absorb a signal that passes through the band stop filter 204B and is reflected on the resonator circuit 112A (e.g. a signal outside the filter band of the filter circuit, which is inputted from the output terminal 209).

The isolator 214C allows a signal to pass in one direction from the band stop filter 204C toward the resonator circuit 112B, and the isolator 214D allows a signal to pass in one direction from the resonator circuit 112B toward the band stop filter 204D, to prevent coupling of the resonator of the band stop filter 204C with the resonator of the band stop filter 204D on a transmission line through the resonator circuit 112B. Further, the isolator 214C also serves to absorb a signal that passes through the band stop filter 204C and is reflected on the resonator circuit 112B to be returned to the terminal 2 (i.e. a signal outside the filter band of the filter circuit). Further, the isolator 214D also serves to absorb a signal that passes through the band stop filter 204D and is reflected on the resonator circuit 112B (e.g. a signal outside the filter band of the filter circuit, inputted from the output terminal 209).

As thus described, the isolators 214A, 214B, 214C, and 214D are provided chiefly for preventing inter-resonator coupling. Meanwhile, the delay circuit 213 between the terminal 4 of the four-port element 202 and the terminal 4 of the four-port element 207 serves to couple through transmission lines between the terminals 4 thereof, the resonators of the band stop filters 204A and 204C with the resonators of the band stop filter 204B, 204D. Namely, the delay circuit 213 serves as a resonator-coupled circuit to couple the resonators of the band stop filter 204A and 204C with the resonators of the band stop filters 204B and 204D. With this delay circuit 213, degeneracy of the resonance frequency is released, and a signal in the stop band which flows along the transmission line between the terminals 4 (e.g. a signal having the center frequency of the filter circuit as its peak) is decomposed inside the stop band into two signals orthogonal to each other (two signals having a reverse-phase relation). Thereby, even when the number of resonators of the band-pass filter is small, it is possible to obtain an output signal with excellent skirt characteristic. This is detailed later.

The delay circuit 203A sets the difference (phase difference) between the electric length from the terminal 1 of the four-port element 202 to the band stop filter 204A and the electric length from the terminal 2 of the four-port element 202 to the band stop filter 204C to 90 degrees. The delay circuit 203A makes a signal, transmitted from the terminal 1, reflected on the band stop filter 204A, and returned to the terminal 1 of the four-port element 202, reverse-phased.

The delay circuit 203D sets the difference (phase difference) between the electric length from the terminal 1 of the four-port element 207 to the band stop filter 204B and the electric length from the terminal 2 of the four-port element 207 to the band stop filter 204D to 90 degrees. The delay circuit 203D makes a signal, transmitted from the terminal 2, reflected on the band stop filter 204D, and returned to the terminal 2 of the four-port element 207, reverse-phased.

The delay circuit 203C sets the difference (phase difference) between the electric lengths from the terminal 1 and the terminal 2 of the four-port element 202 to the resonator circuits 112A and 112B to 0 degree. The delay circuit 203B sets the difference (phase difference) between the electric lengths from the terminal 1 and the terminal 2 of the four-port element 207 to the resonator circuits 112A and 112B to 0 degree. The delay circuit 203B is arranged for the purpose of complementing a phase delay due to arrangement of the delay circuit 203C.

Figure 7:
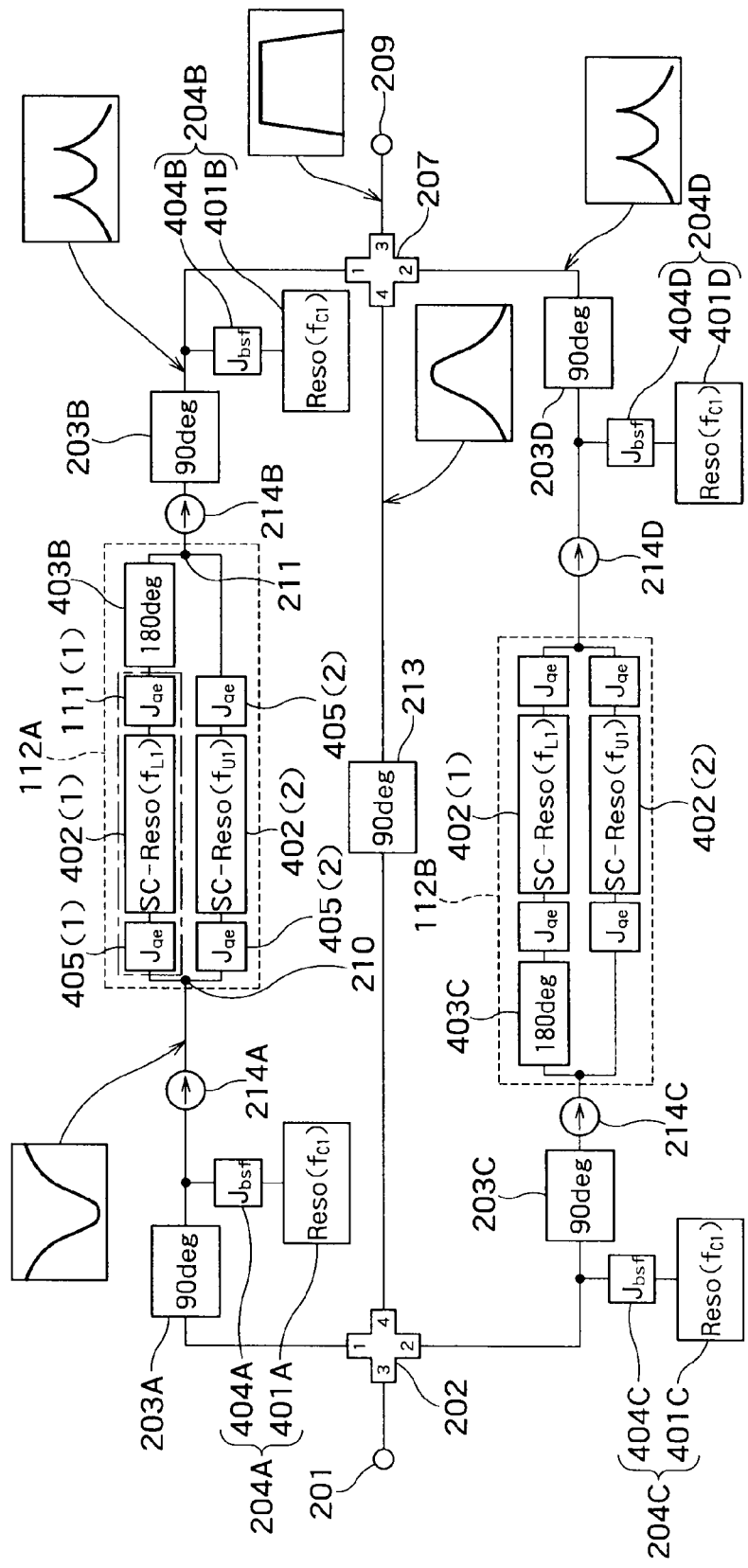
FIG. 7 is a circuit diagram showing a specific example of the filter circuit in FIG. 1.

In describing the operation of the filter circuit in FIG. 1, a filter circuit shown in FIG. 7 obtained by embodying the band stop filter and the resonator circuit of the filter circuit in FIG. 1 is used here for the sake of simplicity of the explanation. First, briefly, a supplementary description of the configuration of the filter circuit in FIG. 7 is given.

In the resonator circuits 112A and 112B, the resonators 402(1) and 402(2) in two blocks and the delay circuits (transmission lines) 403B and 403C which are each cascade-connected to the block including the resonator 402(1), are formed of the superconductor. Couplings 405(1) and 405(2) provide a coupling according to coupling coefficient Jqe. The resonance frequencies of the resonators 402(1) and 402(2) are $f_{L1}$, $f_{U1}$ ($f_{L1}<f_{U1}$), and located on both ends thereof, sandwiching the stop bands of the band stop filters 204A, 204B, 204C, and 204D. Namely, the resonance frequencies $f_{L1}$, $f_{U1}$ are not adjacent to each other, and the delay circuits 403B and 403C are provided not for obtaining combining of a sum of output signals of the blocks in the power combining unit 211, but for obtaining combining of a sum of each of signals with the resonance frequencies $f_{L1}$ and $f_{U1}$ and a signal in the stop band to be adjacent thereto (or making the former reverse-phased to the latter) in the four-port element 207.

The band stop filters 204A, 204B, 204C, and 204D respectively have resonators 401A, 401B, 401C, and 401D which have a center frequency fc1 of the filter circuit as resonance frequencies, and coupling circuits 404A, 404B, 404C, and 404D for coupling the resonators 401A, 401B, 401C, and 401D.

Figure 8A:
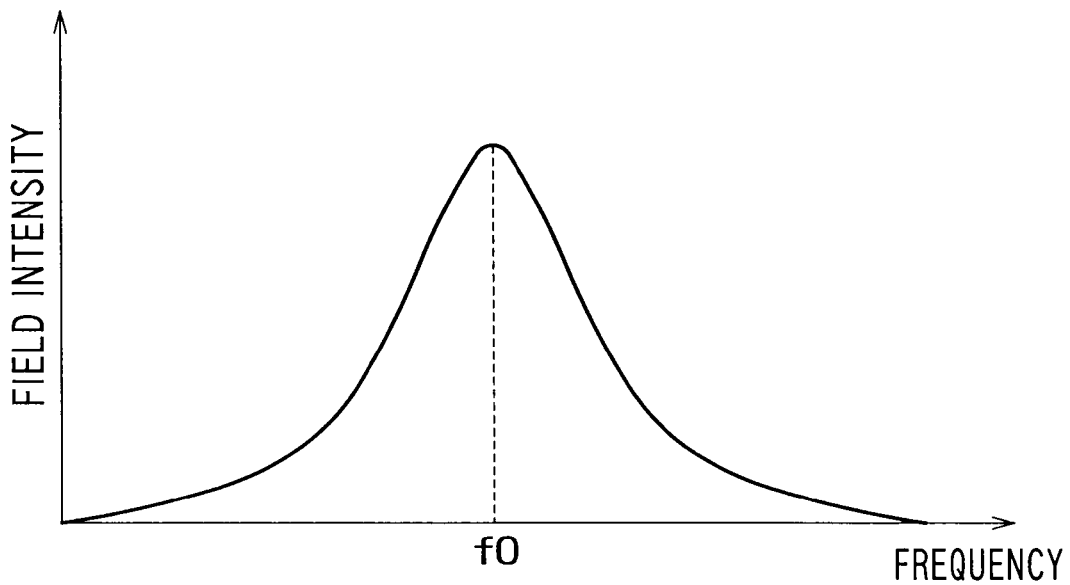
FIGS. 8A and 8B are views showing a frequency response of the filter circuit in FIG. 7.
Figure 8B:
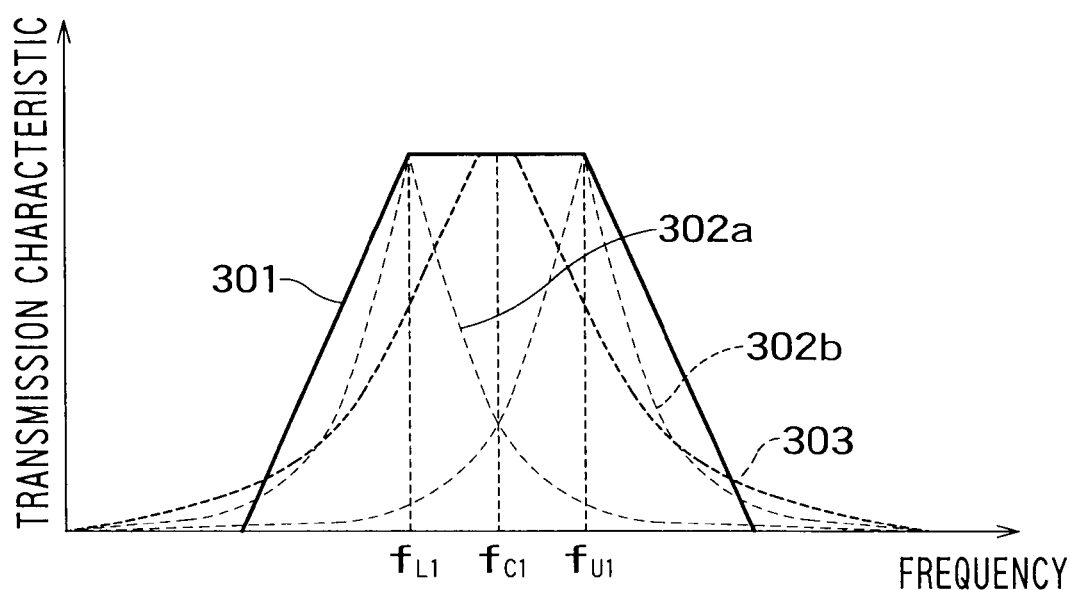

The waveforms shown in FIG. 7 show a pass spectrum at respective positions among circuit nodes illustrated in FIG. 7 in the case of inputting a flat signal as an input signal to the input terminal 201. Further, FIG. 8B shows, as an example, a frequency response in the case of inputting a signal having a spectrum of FIG. 8A as an input signal to the filter circuit in FIG. 7.

In the following, the operation of the filter circuit in FIG. 7 is described.

Power of a signal inputted from the input terminal 201 to the terminal 3 of the four-port element 202 is divided into two, and the two signals are reverse-phase outputted from the terminal 1 and the terminal 2. Out of the signals outputted from the terminal 1, a signal in the vicinity of the center frequency $f_{c1}$ (signal in the stop band) is reflected in the one-stage band stop filter 204A consisting of the resonator 401A and the coupling circuit 404A. Similarly, out of the signals outputted from the terminal 2, a signal in the vicinity of the center frequency $f_{c1}$ (signal in the stop band) is reflected in the one-stage band stop filter 204C consisting of the resonator 401C and the coupling circuit 404C. The signals reflected in the band stop filters 204A and 204C are made by the delay circuit 203A to have the same phase relation, and returned to the terminal 1 and the terminal 2 of the four-port element 202A, and these signals are power-combined and outputted from the terminal 4.

The signal outputted from the terminal 4 of the four-port element 202 (signal in the stop band) is inputted into the terminal 4 of the four-port element 207 through the delay circuit 213. Here, with the 90-degree delay circuit 213, the resonators 401A and 401C on one side of those sandwiching the delay circuit 213 are resonator-coupled with the other-side resonators 401B and 401D, whereby degeneracy of the resonance frequency is released, and the above signal is divided into signals orthogonal to each other (having the reverse-phase relation) inside the stop band.

A signal inputted into the terminal 4 of the four-port element 207 is divided into two, and outputted from the terminal 1 and the terminal 2 while having the same phase relation. Out of the signals outputted from the terminal 1, a signal in the vicinity of the center frequency $f_{c1}$ (signal in the stop band) is reflected in the one-stage band stop filter 204B consisting of one resonator 401B and the coupling circuit 404B. Similarly, also out of the signals outputted from the terminal 2, a signal in the vicinity of the center frequency $f_{c1}$ (signal in the stop band) is reflected in the one-stage band stop filter 204D consisting of one resonator 401D and the coupling circuit 404D. The signals reflected in the band stop filters 204B and 204D are made by the delay circuit 203D to have the reverse-phase relation, and returned to the terminal 1 and the terminal 2 of the four-port element 207. The four-port element 207 combines the signals in the stop band which were inputted into the terminal 1 and the terminal 2, and outputs the combined signal as a first combined signal from the terminal 3.

On the other hand, the signal in the frequency band (signal in the pass band) which was outputted from the terminal 1 of the four-port element 202 and passed through the band stop filter 204A is inputted into the resonator circuit 112A, signals with resonant waveforms by the resonators 402(1) and 402(2) are extracted in the resonator circuit 112A, and a combined wave signal (signals in the desired band) of the extracted signals with the resonant waveforms is outputted. The signal reflected on the input side of the resonator circuit 112A is absorbed in the isolator 214A. Further, the signal in the frequency band (signal in the pass band) which was outputted from the terminal 2 of the four-port element 202 and passed through the band stop filter 204C is inputted into the resonator circuit 112B through the delay circuit 203C, signals with resonant waveforms by the resonators 402(1) and 402(2) are extracted in the resonator circuit 112B, and a combined wave signal (signal in the desired band) of the extracted signals with the resonant waveforms is outputted. The signal reflected on the input side of the resonator circuit 112B is absorbed in the isolator 214C. The signal outputted from the resonator circuit 112A is transmitted oppositely to the signal outputted from the resonator circuit 112B through the delay circuit 203B, and inputted into the terminals 1 and the terminal 2 of the four-port element 207. The four-port element 207 combines the signals in the desired band inputted into the terminal 1 and the terminal 2, and outputs the combined signal as a second combined signal from the terminal 3. Since the foregoing first combined signal is also outputted from the terminal 3, consequently, a combined signal of the first combined signal and the second combined signal (signal in the filter band in combination of the stop band and the desired band) is outputted from the terminal 3.

As thus described, since signals with large power in the vicinity of the center frequency $f_{c1}$ of the filter circuit are reflected in the band stop filters 204A and 204C, and do not pass through the superconductive resonator circuits 112A and 112B, it is possible by the use of the superconductor to realize both a steep filter characteristic and a filter characteristic with a high power handling capacity.

Figure 22:
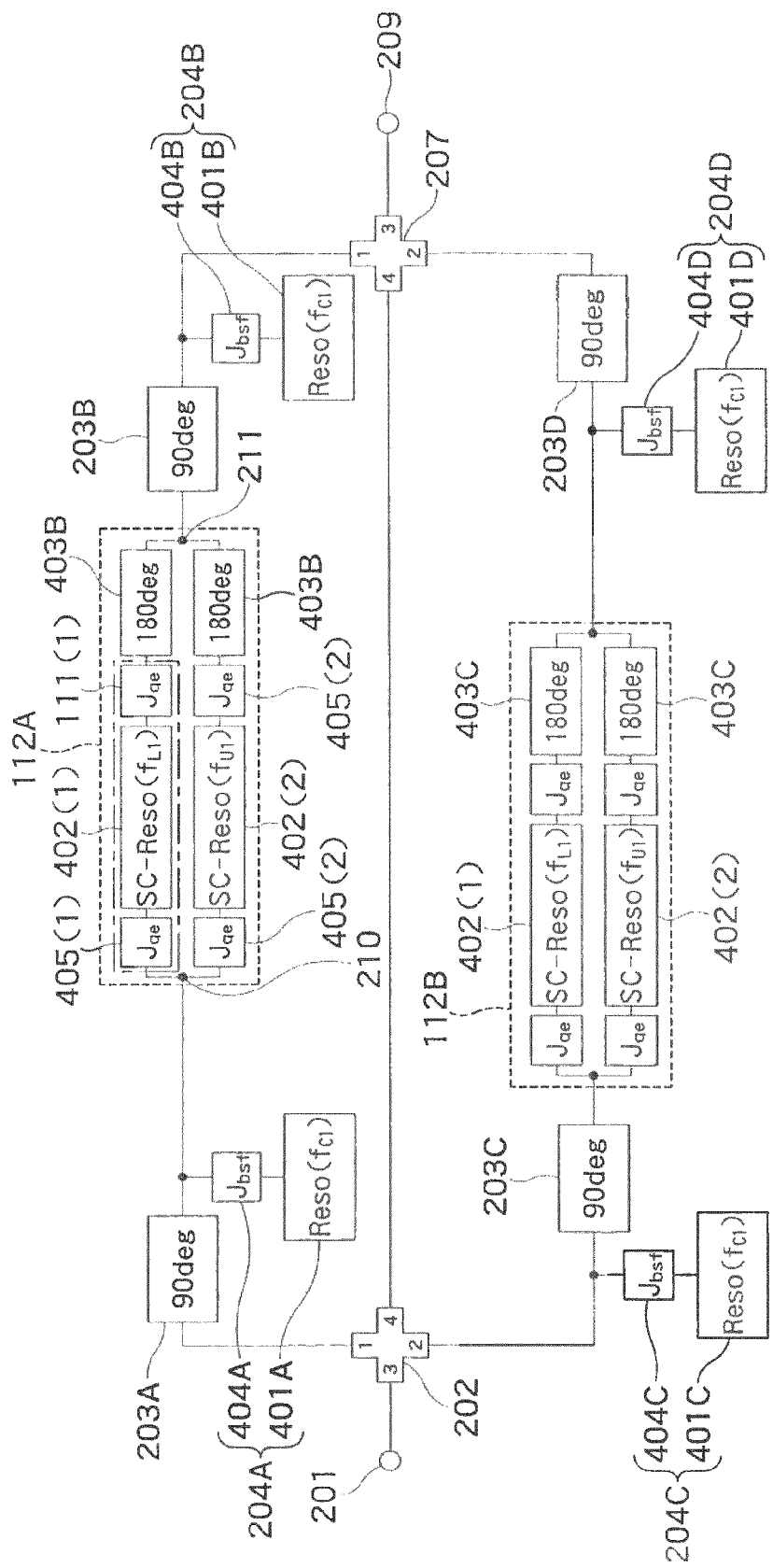
FIG. 22 is a circuit diagram showing a configuration of a filter circuit to which an unpublished invention according to an application prior to the present invention has been applied.
Figure 23:
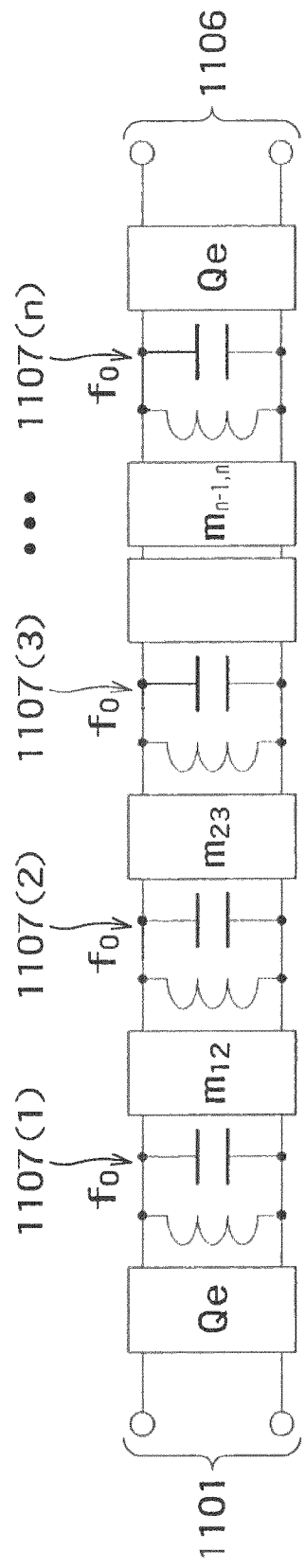
FIG. 23 is a circuit diagram showing a conventional cascade-connection type filter circuit.
Figure 24:
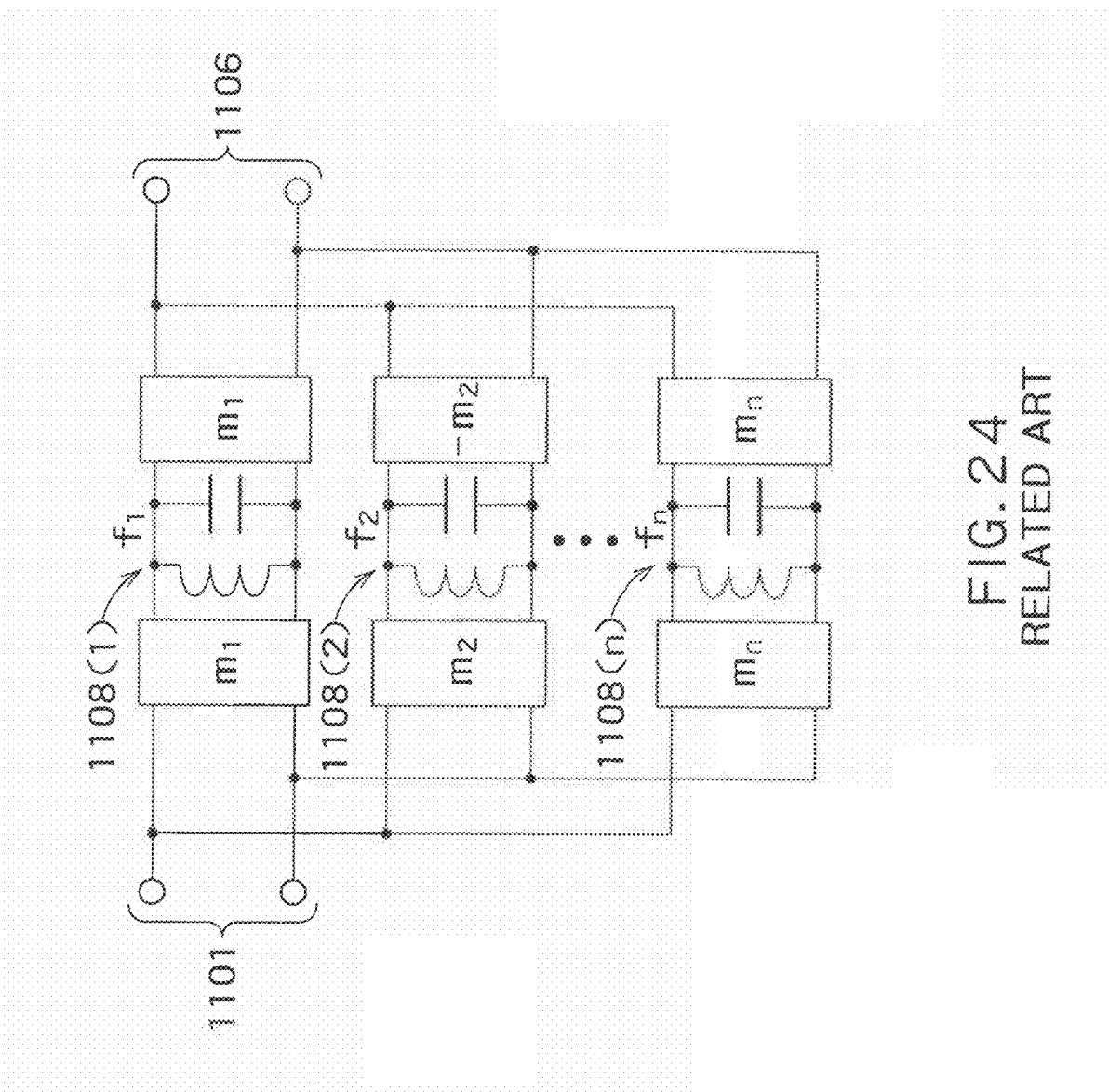
FIG. 24 is a circuit diagram showing a conventional parallel-connection type filter circuit.

Here described are: a difference between the filter circuit in FIG. 7 and a filter circuit according to an invention (unpublished invention) which was made prior to the time of the present invention by the present inventor, filed to the Japan Patent Office as Japanese Patent Application No. 2006-332415 on Dec. 8, 2006, and unpublished at the time of filing of the present invention; and advantages of the present invention. FIG. 22 shows an example of the filter circuit according to this unpublished invention.

The filter circuit shown in FIG. 7 is significantly different from the filter circuit in FIG. 22 in that the delay circuit 213 is not provided between the four-port elements 202 and 207 and the isolators 214A, 214B, 214C, and 214D are not provided in the filter circuit in FIG. 22. It is to be noted that, although the delay circuits 403(B) and 403(C) are cascade-connected to the resonators 402(1) and (402(2) in the resonator circuits 112A and 112B in the filter circuit in FIG. 22, this is aimed at obtaining sum combining with a signal in the stop band in the four-port element 207, and does not have an essential effect on the difference from the filter circuit in FIG. 7.

Even in the filter circuit in FIG. 22, both the steep filter characteristic and the filter characteristic with the high power handling capability are sufficiently achieved as compared with the conventional filter circuit described in "Description of the Related Art". However, in the filter circuit in FIG. 7, a further steeper filter characteristic (skirt characteristic) is realized without increasing the size of the circuit (without increasing the number of resonators used) from the filter circuit in FIG. 22.

Figure 9A:
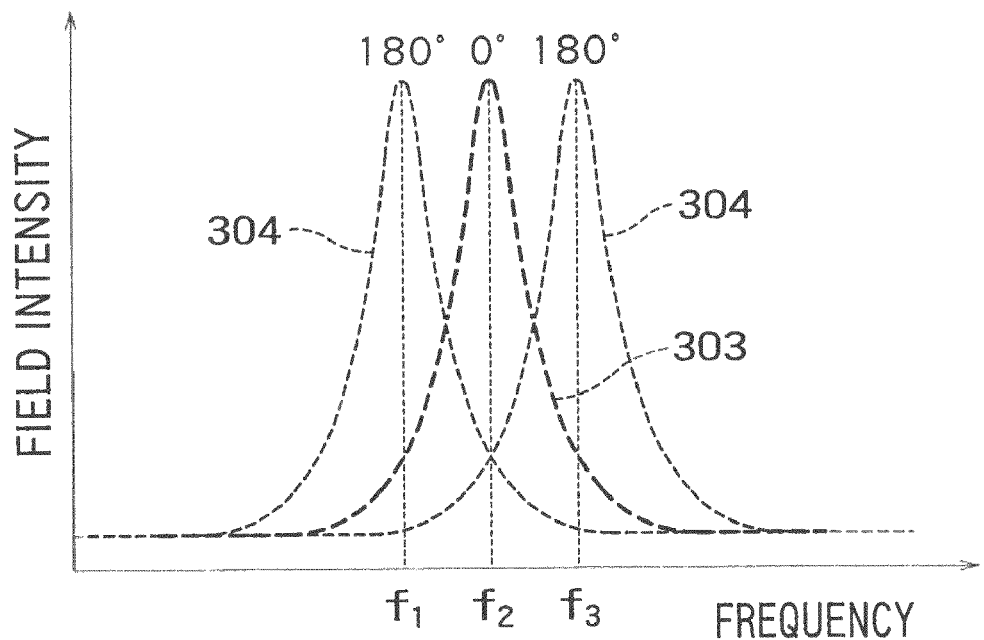
FIGS. 9A and 9B are views explaining a difference in characteristic between the filter circuits of FIGS. 7 and 22.

FIG. 9A is a view showing a characteristic of the filter circuit (frequency arrangement) in FIG. 22. Dotted lines 303 indicate the return loss characteristic of the band stop filters 204A, 204B, 204C, and 204D, and broken lines 304 indicate the transmission characteristics of the resonators 402(1) and 402(2) of the resonator groups 112A and 112B. The phase values illustrated at the resonance peaks of the wave forms expressing the return loss characteristic and the transmission characteristics show an example of phase conditions for combining a sum of the respective waveforms (the phase difference of the adjacent frequencies is 180 degrees). In the unpublished invention, as shown in FIG. 22, four band stop filters 204A, 204B, 204C, and 204D are not coupled so that assembly of these four band stop filters 204A, 204B, 204C, and 204D is activated equivalently as a band stop filter made of one resonator.

Figure 9B:
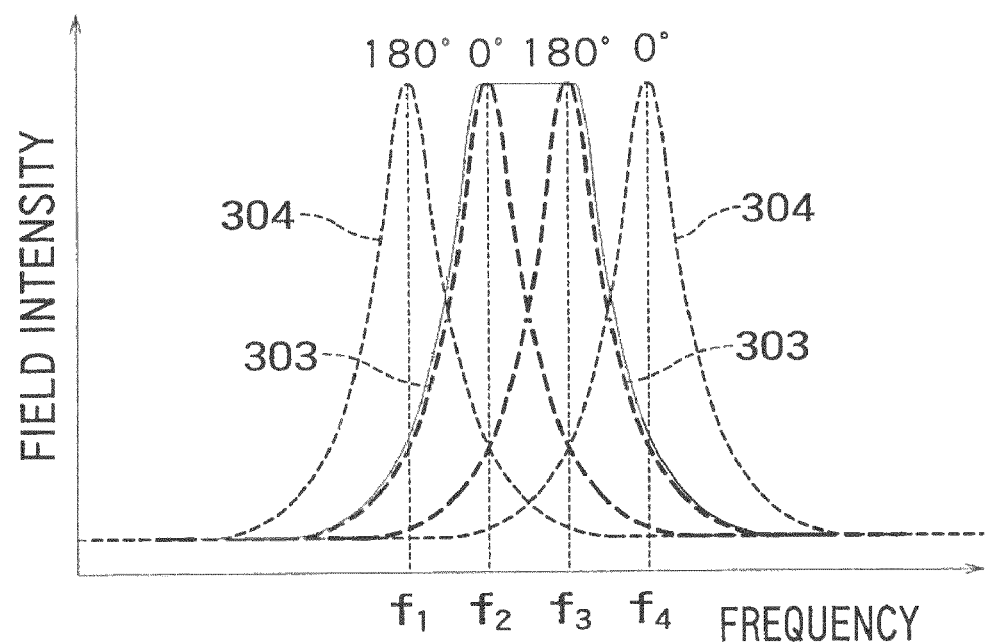

As opposed to this, in the filter circuit in FIG. 7, band stop filters 204A, 204B, 204C, and 204D are coupled by the delay circuit 213, and thereby, the filters are activated equivalently as a band stop filter made of two resonators. FIG. 9B shows the characteristic (frequency arrangement) of the filter circuit in FIG. 7. As compared with the characteristic of FIG. 9A, a further steeper filter characteristic (skirt characteristic) is realized.

Here, there is a problem that the addition of the delay circuit 213 causes the four band stop filters 204A, 204B, 204C, and 204D to be unbalanced, undesirably generating a strong coupling through the resonator groups 112A and 112B. With the strong coupling present, a problem such as deterioration in filter characteristic outside the band may occur. Namely, since weak coupling cannot be generated, controlling a resonance frequency to bring the resonance frequency inside the band cannot be performed. In order to improve this problem, the isolators 214A, 214B, 214C, and 214D are added so as to sandwich the resonator groups 112A and 112B for the purpose of limiting a transmission line to contribute to the coupling of the band stop filters 204A, 204B, 204C, and 204D to the transmission line of the delay circuit 213. The coupling through the resonator groups 112A and 112B is thereby removed, and controlled by the delay circuit 213 in FIG. 7, whereby it is possible to activate in the filter circuit the four band stop filters 204A, 204B, 204C, and 204D equivalently as a band stop filter having two resonators.

Figure 10:
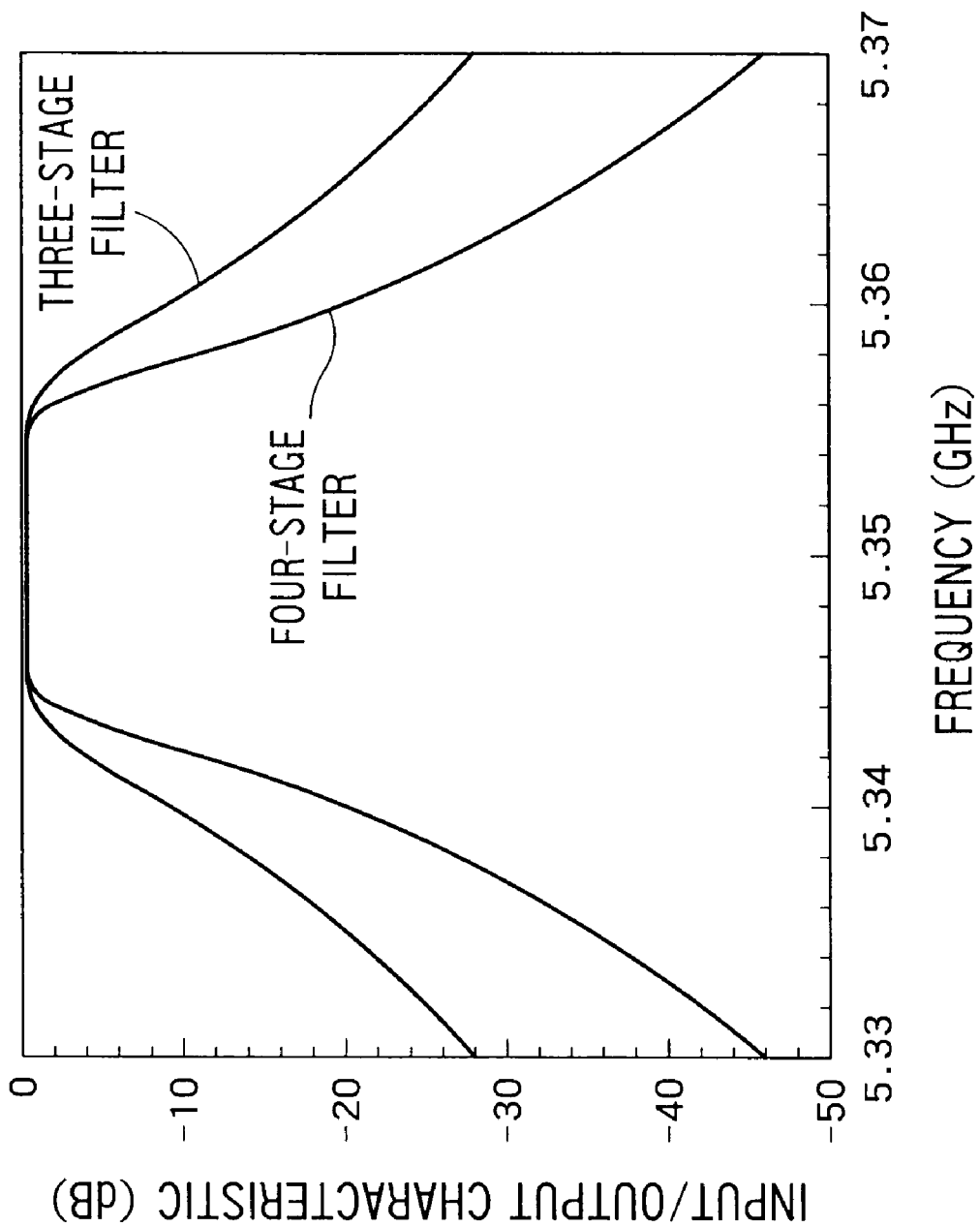
FIG. 10 is a view explaining an effect of the filter characteristic which is exerted when the number of resonators in the filter circuit increases.

FIG. 10 shows a typical effect of a filter characteristic exerted when the number of resonators increases in the filter circuit. In FIG. 10, the filter circuit in FIG. 22 is referred to as a three-stage filter equivalent, and the filter circuit in FIG. 7 is referred to as a four-stage filter with four equivalent resonators due to the coupling although the number of resonators is the same as the above filter circuit. As understood from FIG. 10, generally, with increase in number of resonators, a filter having a steep input/output characteristic can be configured as a filter characteristic.

Therefore, according to the present embodiment, it is possible to realize a further steeper filter characteristic although the number of resonators is the same as compared with the above unpublished invention. Namely, it is possible to obtain an equivalent effect as the effect of increasing the number of resonators without increasing the size of the circuit.

Figure 11:
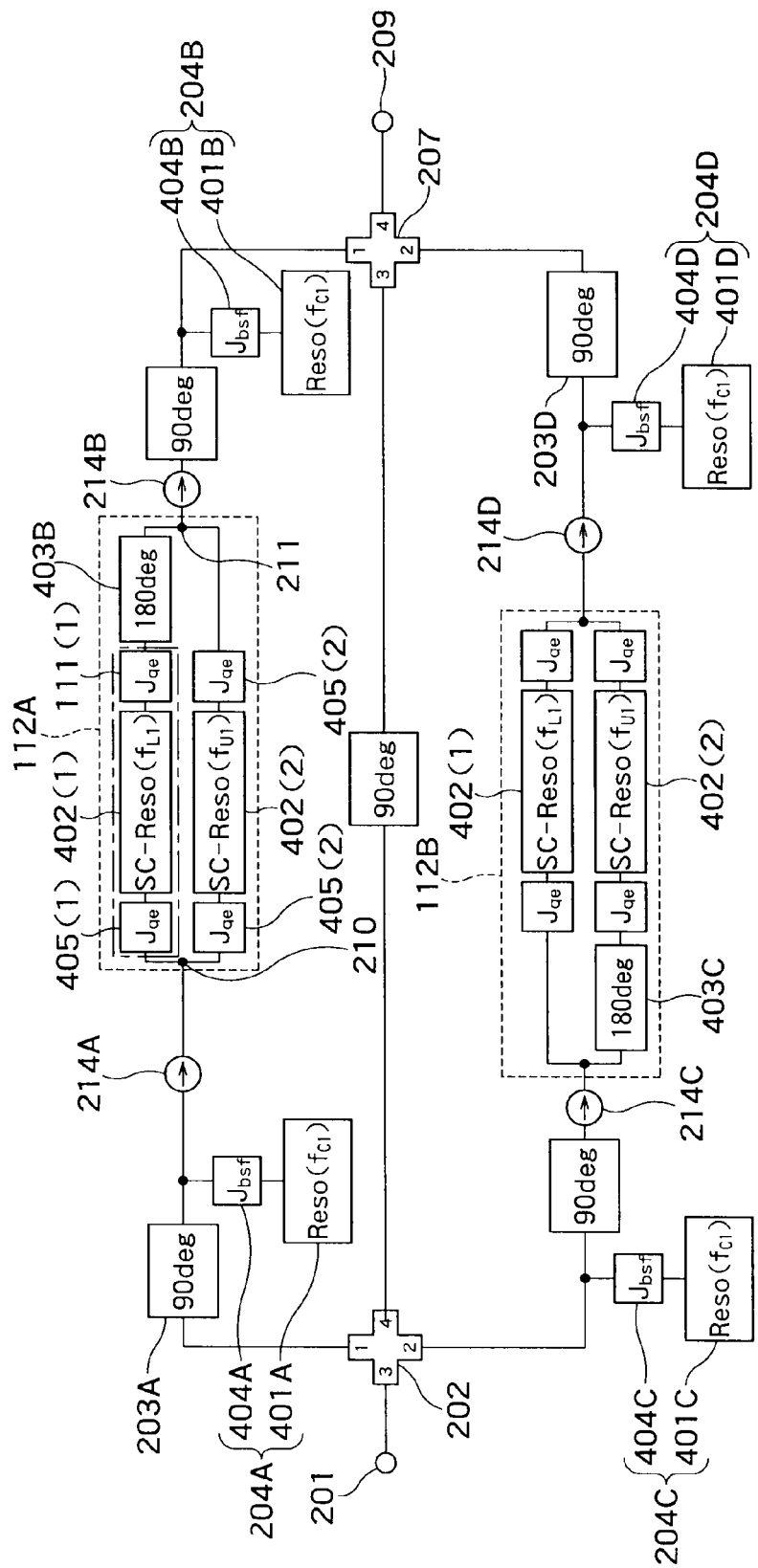
FIG. 11 is a view showing an example of modifying connection on an output-side of a four-port element in the filter circuit of FIG. 7.

FIG. 11 shows an example of the case of inverting the respective places to which the terminal 3 and the terminal 4 of the four-port element 207 are connected in the filter circuit of FIG. 7. In this case, for the purpose of setting a signal which is inputted into terminal 1 of the four-port element 207 through the resonator circuit 112A and a signal which is inputted into the terminal 2 of the four-port element 207 through the resonator circuit 112B to have the same phase, the delay circuit 403C inside the resonator circuit 112B is arranged not in the upper-side block including the resonator 402(1) but in the lower-side block including the resonator 402(2). Although FIG. 11 showed the example of inverting the respective places to which the terminal 3 and the terminal 4 of the four-port element 207 are connected, the respective places to which the terminal 3 and the terminal 4 of the four-port element 202 are connected may be inverted, or the respective places to which the terminals 3 and the terminals 4 of both the four-port elements 202 and 207 may be inverted.

Figure 12:
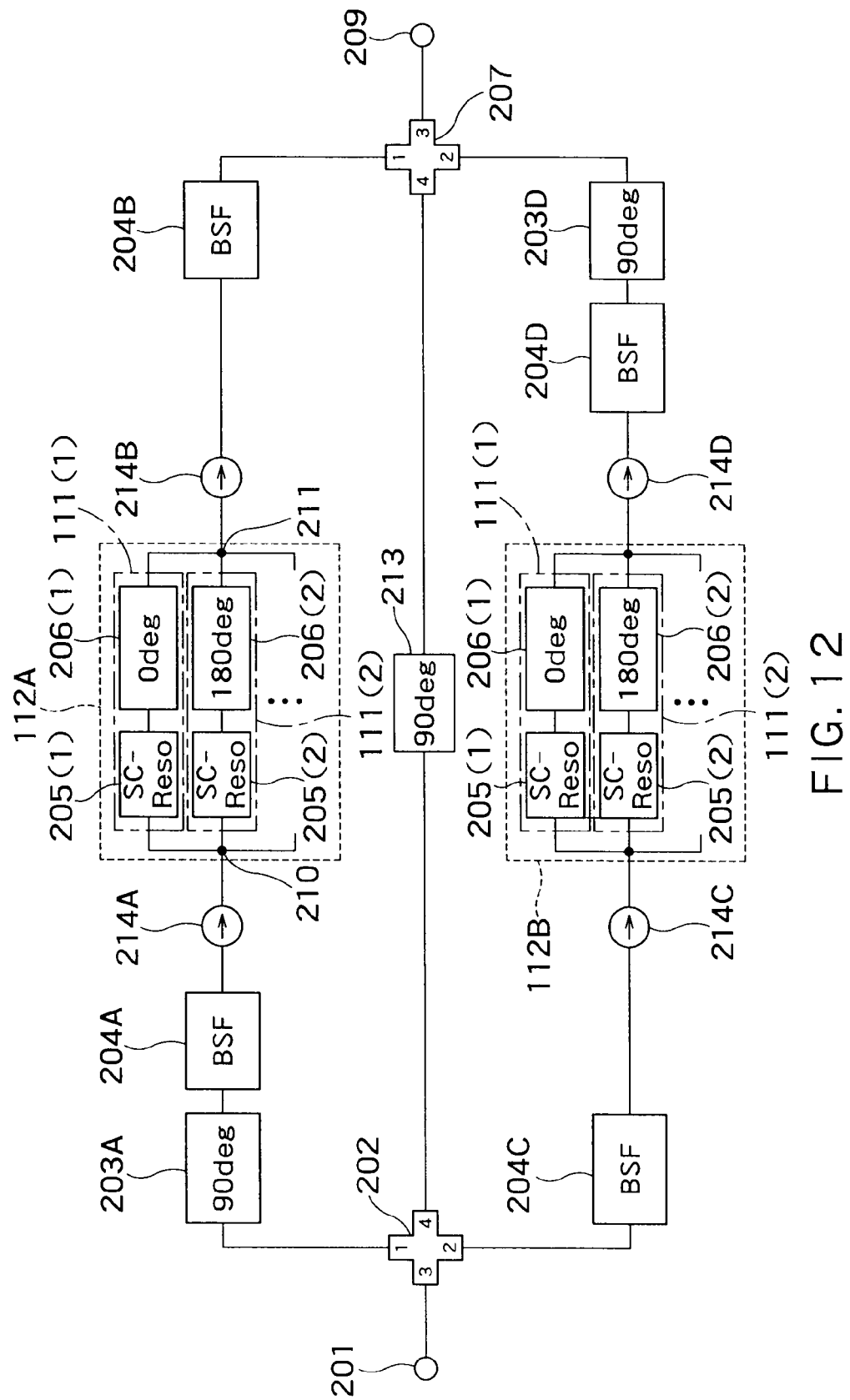
FIG. 12 is a view showing a modified example of the filter circuit in FIG. 1.

FIG. 12 shows a configuration where the delay circuits 203B and 203C in the filter circuit of FIG. 1 are omitted. Even with the delay circuits 203B and 203C removed, the same filter characteristic can be realized due to the presence of the isolators 214A, 214B, 214C, and 214D for absorbing signals reflected on the input sides and the output sides of the resonator groups 112A and 112B. Namely, in the filter circuit in FIG. 22 in the unpublished invention, the delay circuits 203B and 203C for satisfying the phase conditions in the four-port elements 202 and 207 are required since signals reflected on the input sides and the output sides of the resonator circuits 112A and 112B are released from the terminal 3 of the four-port element 202, but in the filter circuit in FIG. 1, the reflection signals are absorbed in the isolators 214A, 214B, 214C, and 214D, thereby enabling realization of the same filter characteristic as in FIG. 1, even without the delay circuits 203B and 203C.

Figure 13:
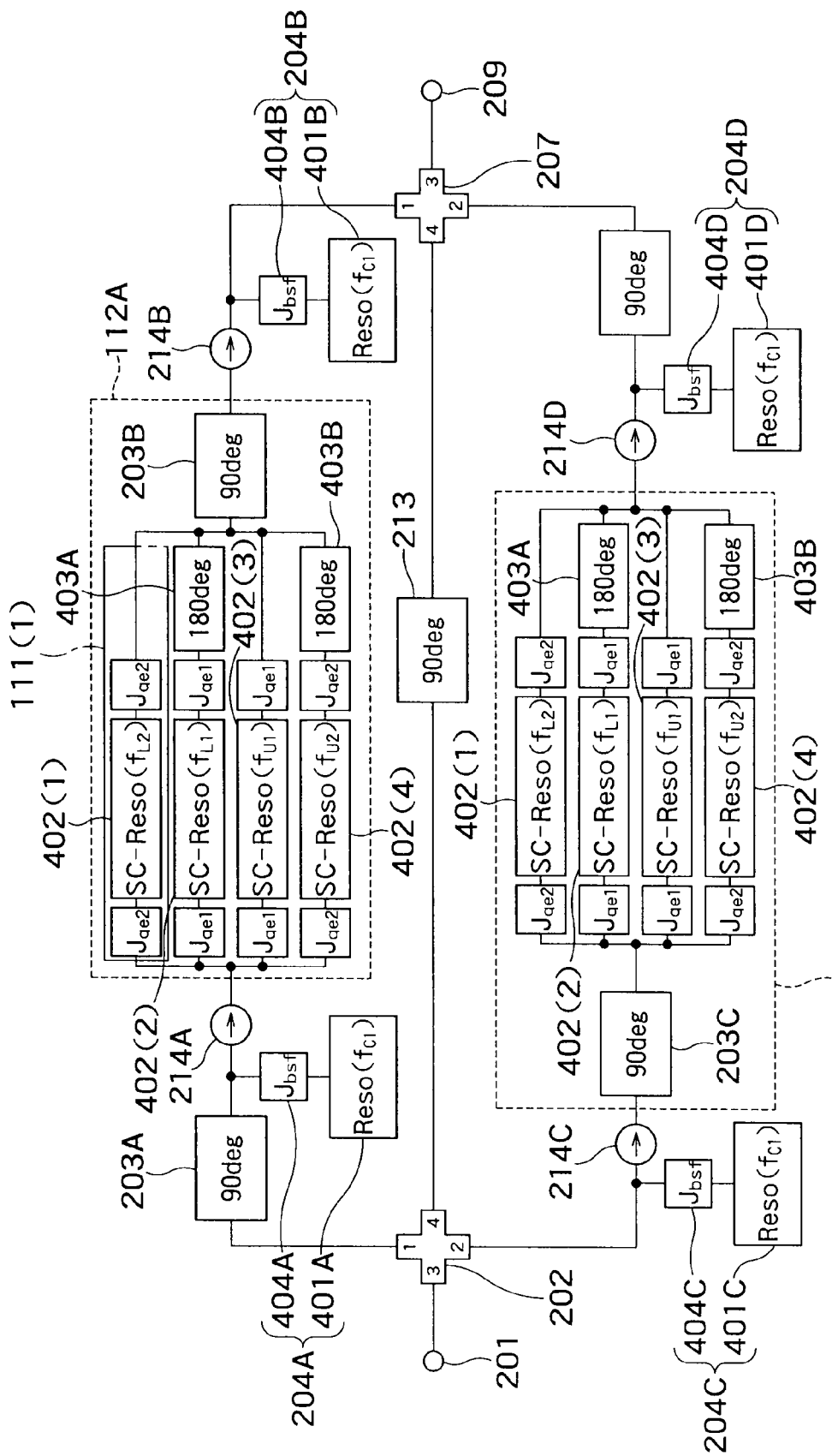
FIG. 13 is a view showing a modified example of the filter circuit in FIG. 7.
Figure 14:
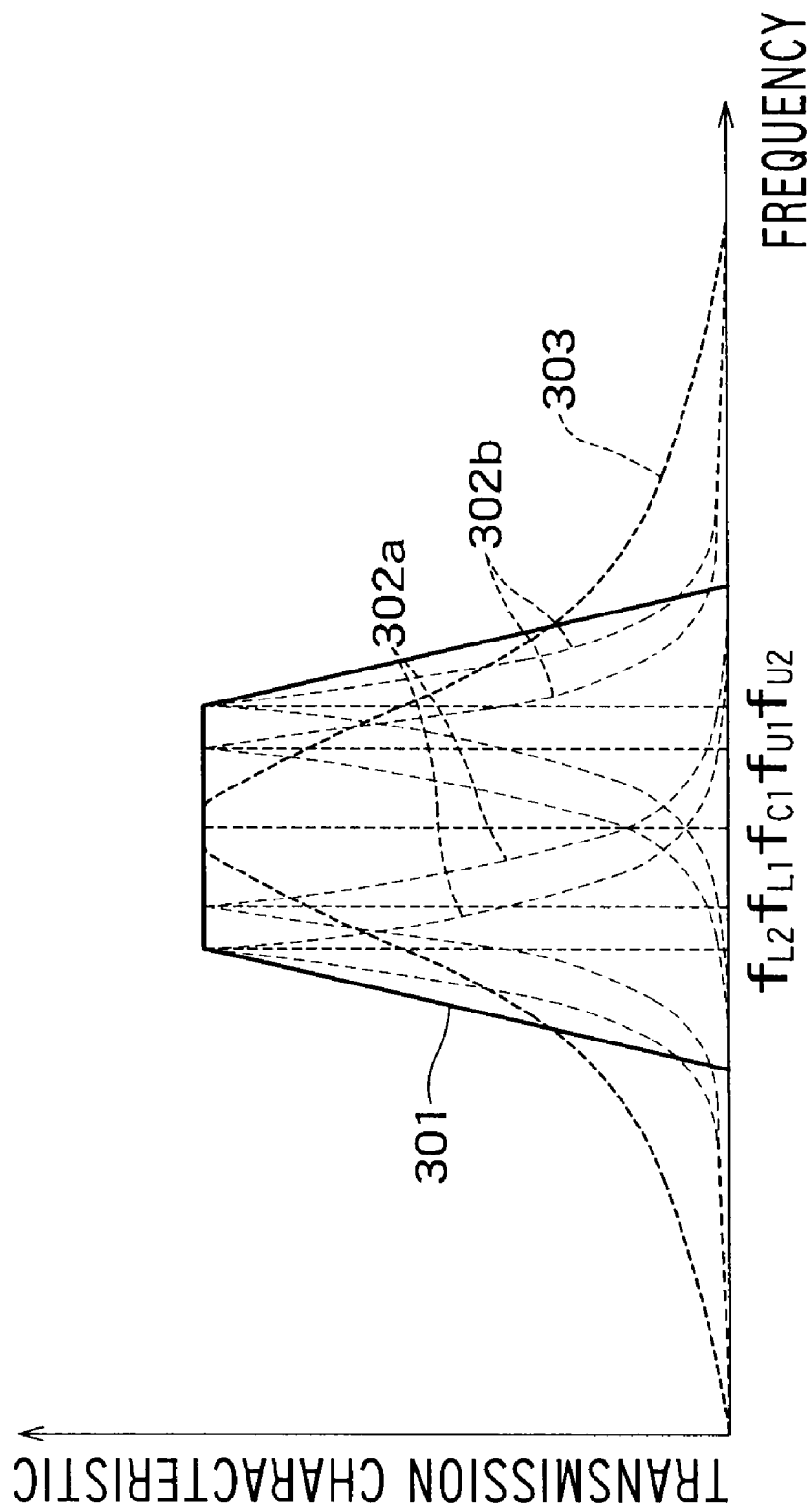
FIG. 14 is a view showing a frequency response of the filter circuit in FIG. 13.

FIG. 13 shows an example of the case of arranging, in parallel, the four resonators 402(1), 402(2), 402(3), and 402(4) formed of the superconductor inside the resonator circuits 112A and 112B. The resonance frequencies $f_{L2}$, $f_{L1}$ ($f_{L2}<f_{L1}$) of the resonators 402(1) and 402(2) are included in the low band side among the band outside stop band (pass band) of the band stop filter 204A. In order to combine a sum of signals extracted in the resonators 402(1) and 402(2), these signals are made by the delay circuit 403A to have a 180-degree phase difference. The resonance frequencies $f_{U1}$, $f_{U2}$ ($f_{U1}<f_{U2}$) of the resonators 402(3) and 402(4) are included in the high band side among the band outside stop band (pass band) of the band stop filter 204A. In order to combine a sum of signals extracted in the resonators 402(3) and 402(4), these signals are made by the delay circuit 403B to have a 180-degree phase difference. It is to be noted that, although the delay circuits 203B and 203C are arranged inside the two isolators, they may be arranged outside the two isolators as in the filter circuit in FIG. 7. FIG. 14 shows a frequency response of the filter circuit in FIG. 13. As revealed by comparison with FIG. 8B showing the frequency response of the filter circuit in FIG. 7, it is possible to obtain a filter having a further steeper input/output characteristic 301 by increasing the number of resonators used.

Figure 15:
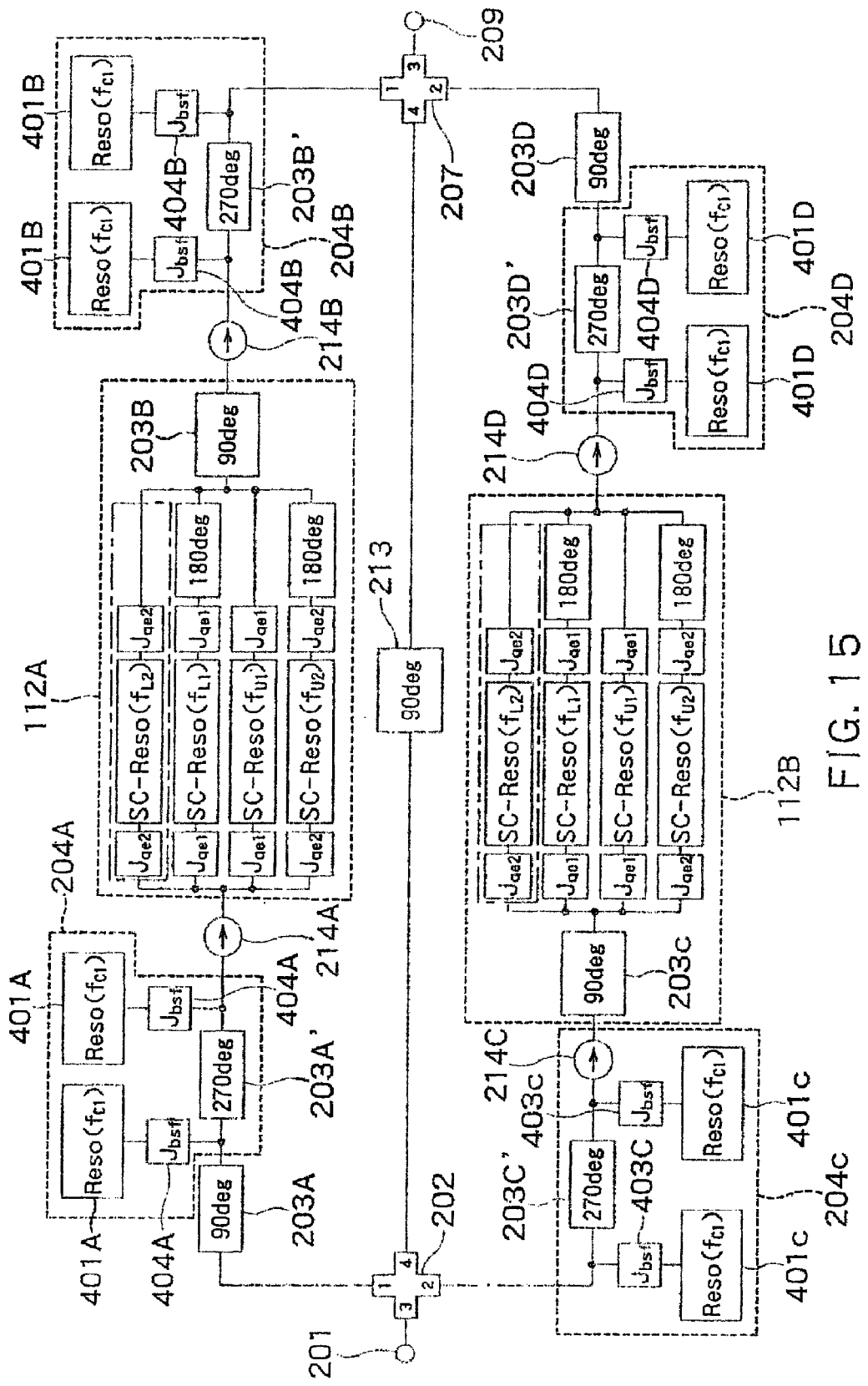
FIG. 15 is a view showing an example of constituting a band stop filter with the use of two resonators in the filter circuit in FIG. 13.

FIG. 15 shows an example of configuring the band stop filter with the use of two resonators in the filter circuit in FIG. 13. For example, the band stop filter 204A consists of two resonators 401A, two coupling circuits 404A, and a delay circuit 203A'. In the same manner, the other band stop filters 204B, 204C, and 204D consist of two resonators, two coupling circuits and delay circuits 203B', 203C', and 203D'. The delay circuits 203A', 203B', 203C', and 203D' each comprise a phase delay circuit that provides a 270 degree phase delay.

Figure 16:
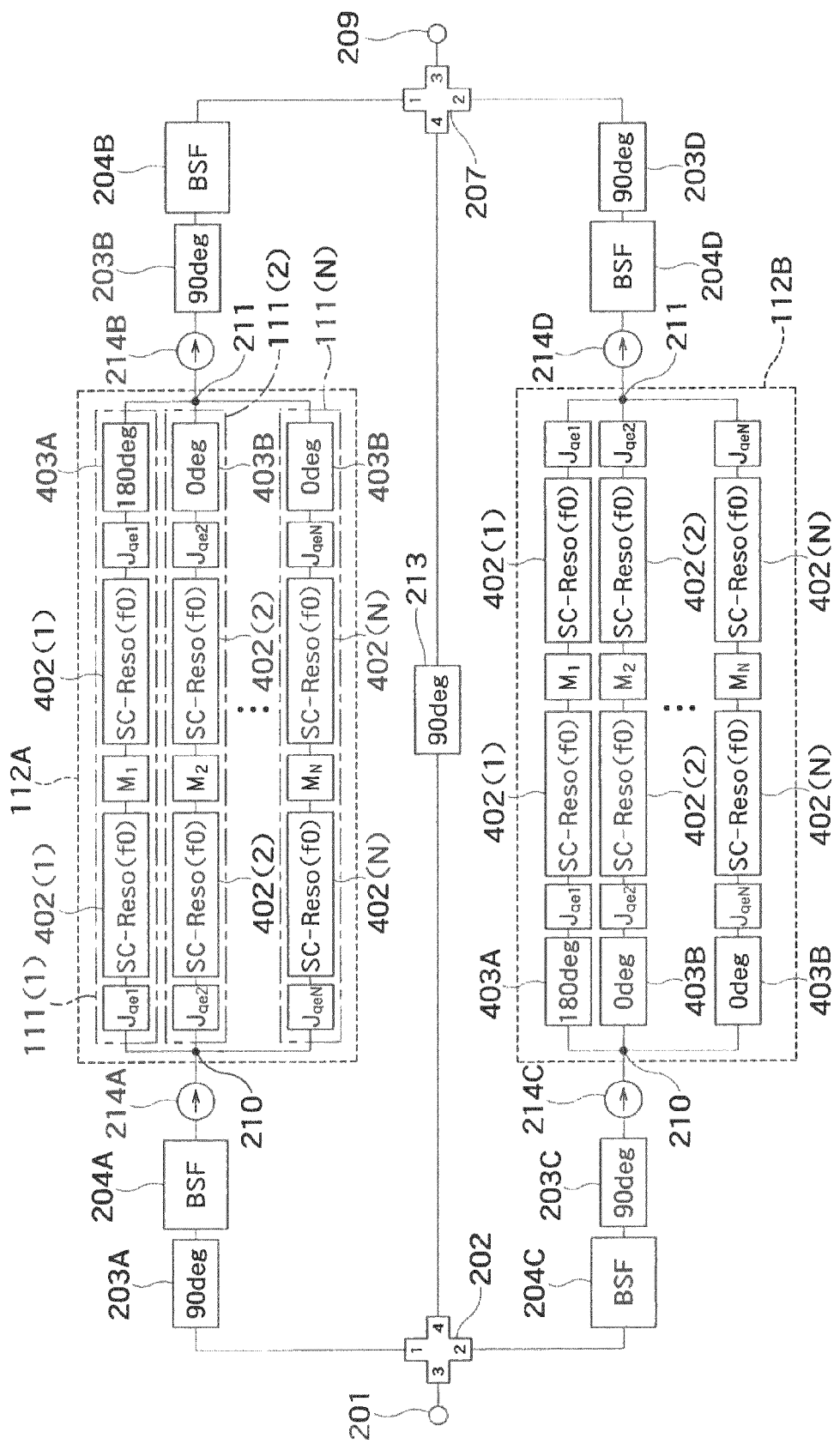
FIG. 16 is a circuit diagram showing a second embodiment of the filter circuit of the present invention.

FIG. 16 shows a second embodiment of the filter circuit according to the present invention.

This filter circuit differs chiefly from the filter circuit in FIG. 1 in configuration of the resonator circuits 112A and 112B. In the resonator circuits 112A and 112B in this filter circuit, a plurality of blocks 111(N), where two superconductive resonators 402(N) sandwiched by three coupling circuits and delay circuits (403A and 403B) are cascade-connected, are connected in parallel between the power divider 210 and the power combining unit 211. In addition, in the resonator circuit 112B, the delay circuits 403A and 403B are placed not immediately before the power combining unit 211, but immediately after the power divider 210. However, those circuits may be arranged immediately before the power combining unit 211.

The power handling capability Wreso of the resonator 402 (N) inside each of the resonator circuits is smaller than the power handling capability Wbsf of each of the band stop filters 204A, 204B, 204C, and 204D. The resonators 402(N) have the same resonant frequency $f_o$. Signals having resonance frequencies with degeneracy having been released due to coupling of adjacent resonators have a phase difference in a range of 180+360×k±30 degrees ("k" is an integer not smaller than 0) between the adjacent blocks. The following relations are established: $J_{qe1} > J_{qe2} > \ldots > J_{qeN}$ (in the case of description using the external Q, Qe1<Qe2<...<QeN), and [frequency difference "fbsf2−fbsf1" between two points that determine the 3 dB band width of the return loss characteristic of the band stop filter]<[inter-resonator coupling coefficient Mj]×[center frequency $f_0$]. The number of resonators inside the band stop filters 204A, 204B, 204C, and 204D is an even number.

Figure 17:
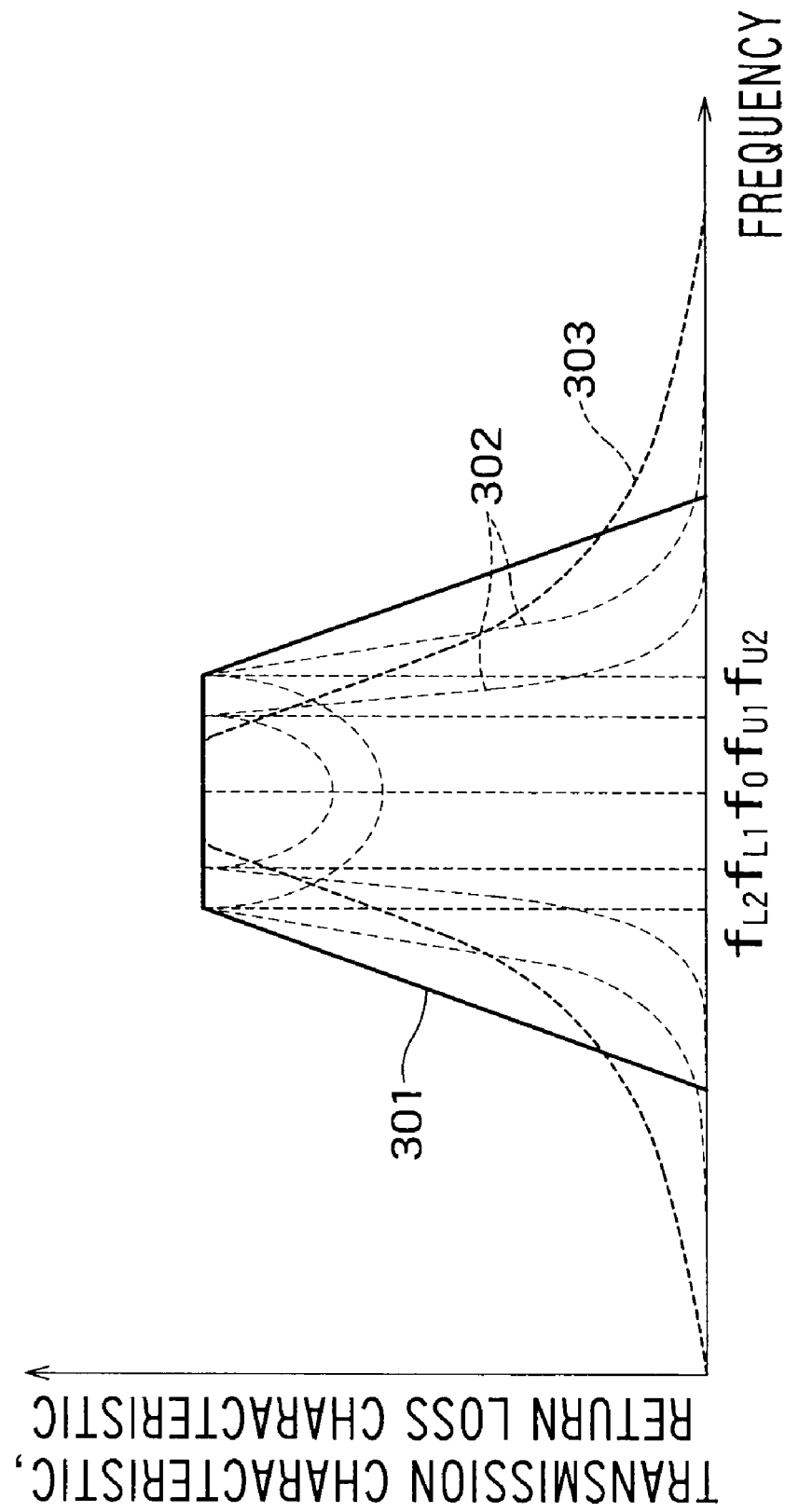
FIG. 17 is a view showing a frequency response of the filter circuit in FIG. 16.

FIG. 17 shows a frequency response of the filter circuit in FIG. 16. The filter characteristic 301 is realized through the use of superposition of the resonant waveforms 302 with degeneracy having been released. With increase in inter-resonator coupling coefficient Mj, the difference in frequency with degeneracy having been released (peak width of the resonant waveforms 302) increases. Here, the relation of: $M_1 = (f_{U1} - f_{L1})/f_0$, $M_2 = (f_{U2} - f_{L2})/f_0$, is established.

Figure 18:
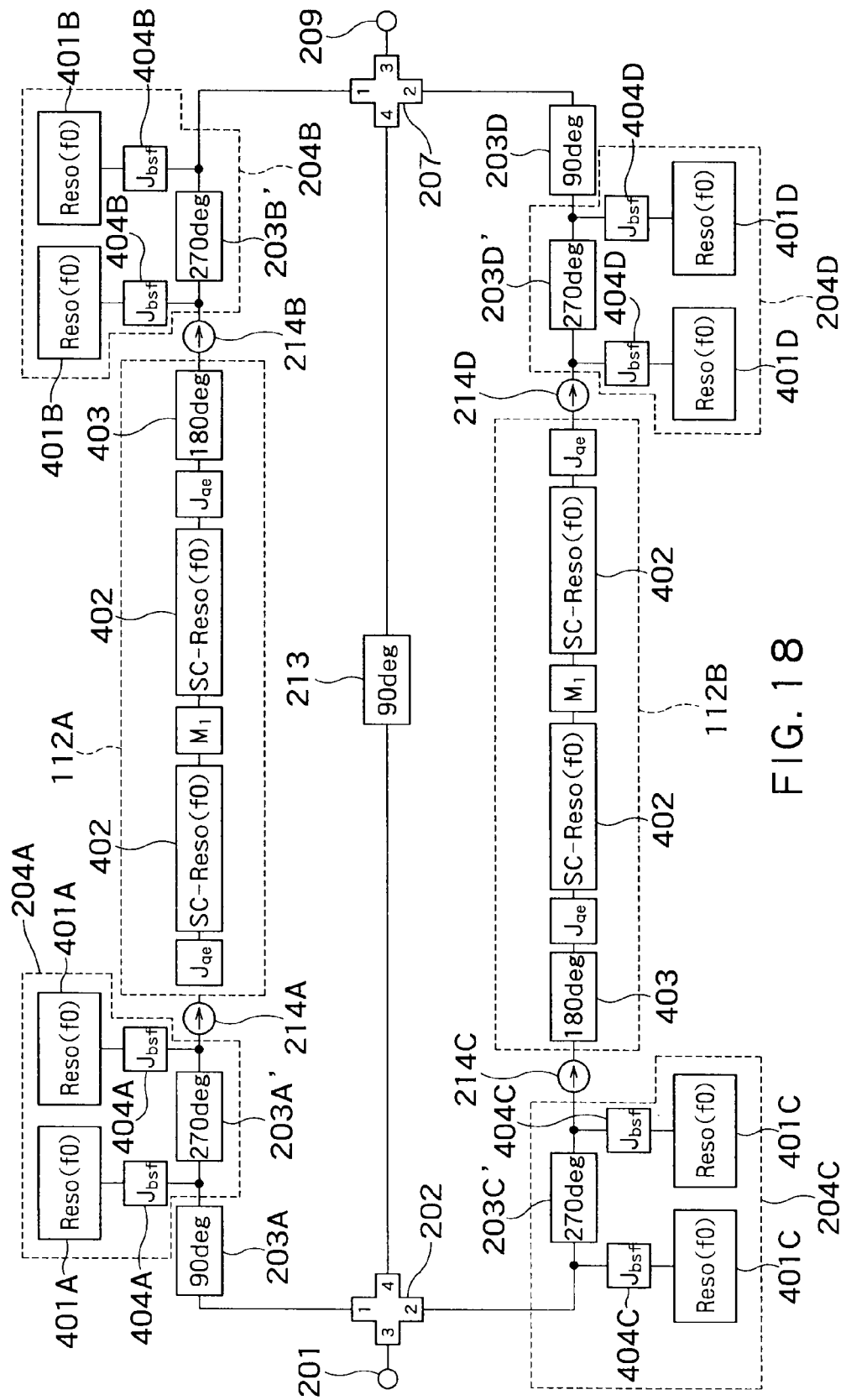
FIG. 18 is a modified example of the filter circuit in FIG. 16.

FIG. 18 shows an example of the filter circuit in the case of configuring the band stop filter with the use of two resonators in the filter circuit in FIG. 16, setting the number of blocks in each of the resonator circuits 112A and 112B to one. As thus shown, the number of blocks including cascade connection of the superconductive resonators may be only one.

Figure 19:
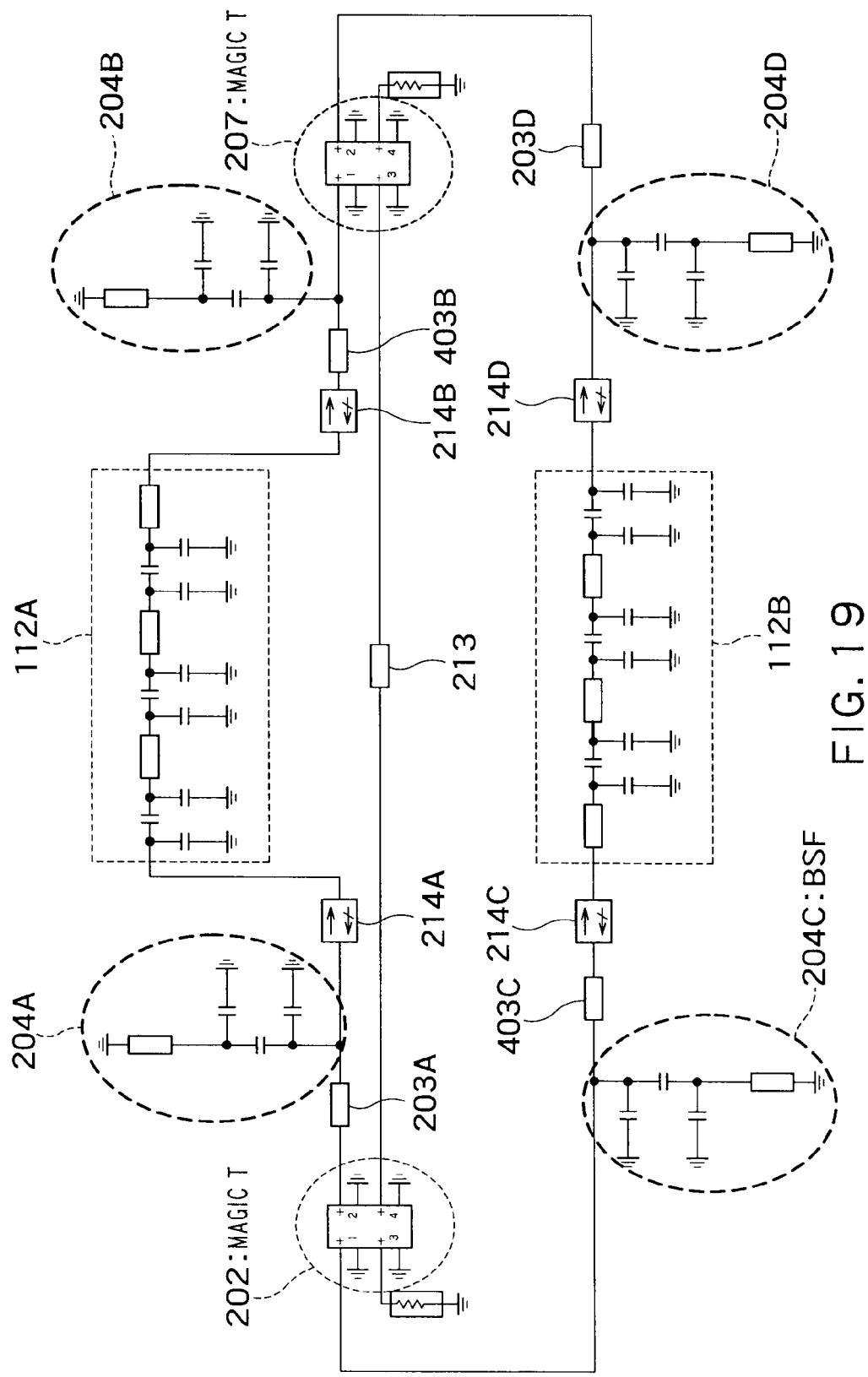
FIG. 19 is a view showing a circuit example in which a simulation is performed.
Figure 20:
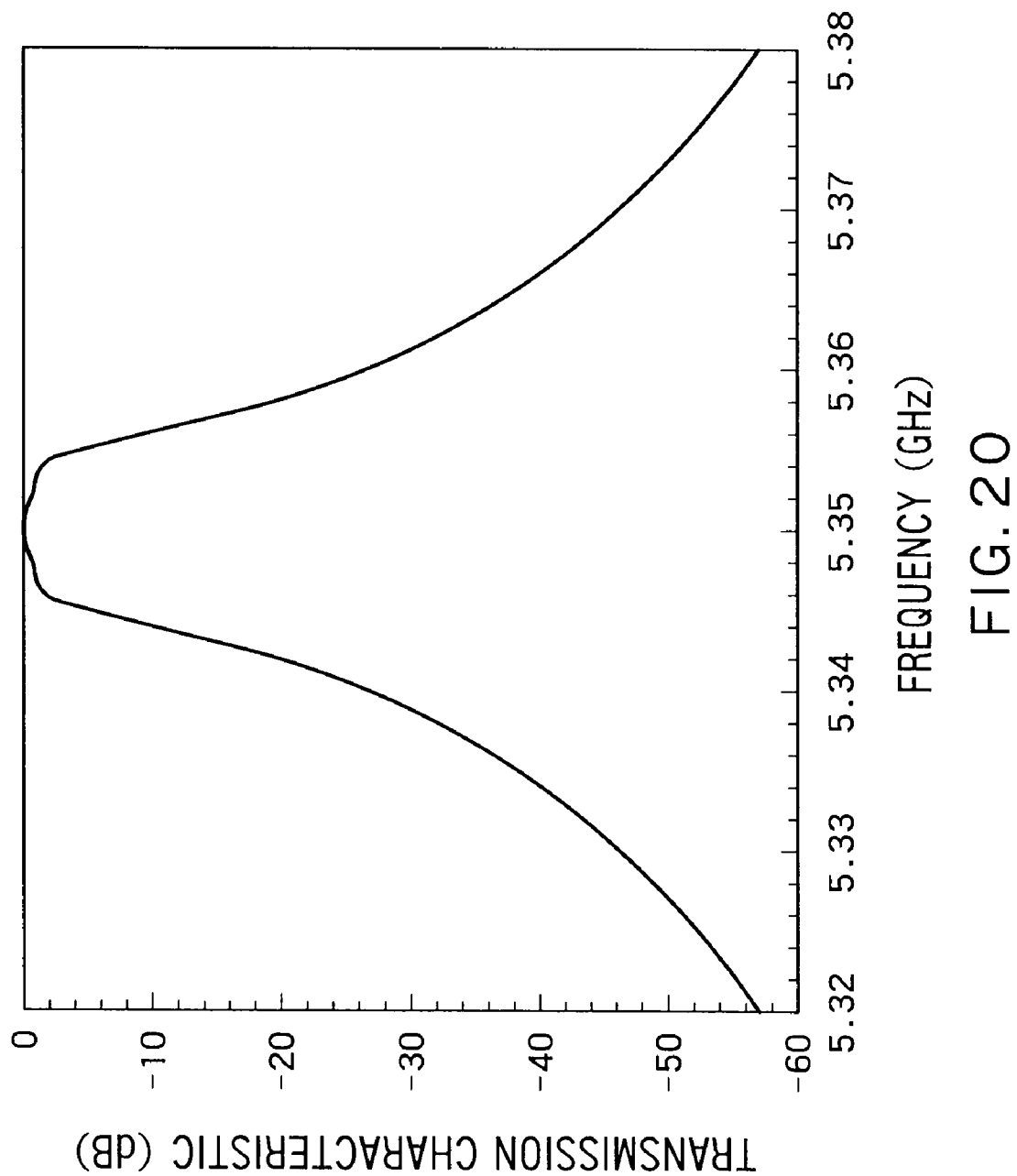
FIG. 20 is a view showing a frequency response obtained by the simulation.

FIG. 19 shows an example of a circuit in which simulation is performed for checking an operation of the filter circuit according to the present invention. This filter circuit corresponds to one configured such that the number of blocks inside each resonance circuit is one and each band stop filter is made up of one resonator in the filter circuit in FIG. 16. Parameters used in calculation are: $f_{c1} = 5.26$ GHz, $f_{L1} = 5.2551$ GHz, and $f_{U1} = 5.2649$ GHz, and the calculation was performed assuming that the coupling coefficient $J_{bsf}$ of the resonator inside the band stop filter is 0.036, and $J_{qe}$ as the external Q of the resonator inside the resonator circuit is 1600. FIG. 20 shows a transmission characteristic of the filter as a result of the calculation. A π-type circuit of capacitance is used as the coupling circuit, a 180-degree transmission line is used as a resonator inside each of the resonator circuits 112A 112B, and a one-side short-circuited 90-degree transmission line is used as the resonator of the band stop filter 204.

Figure 21:
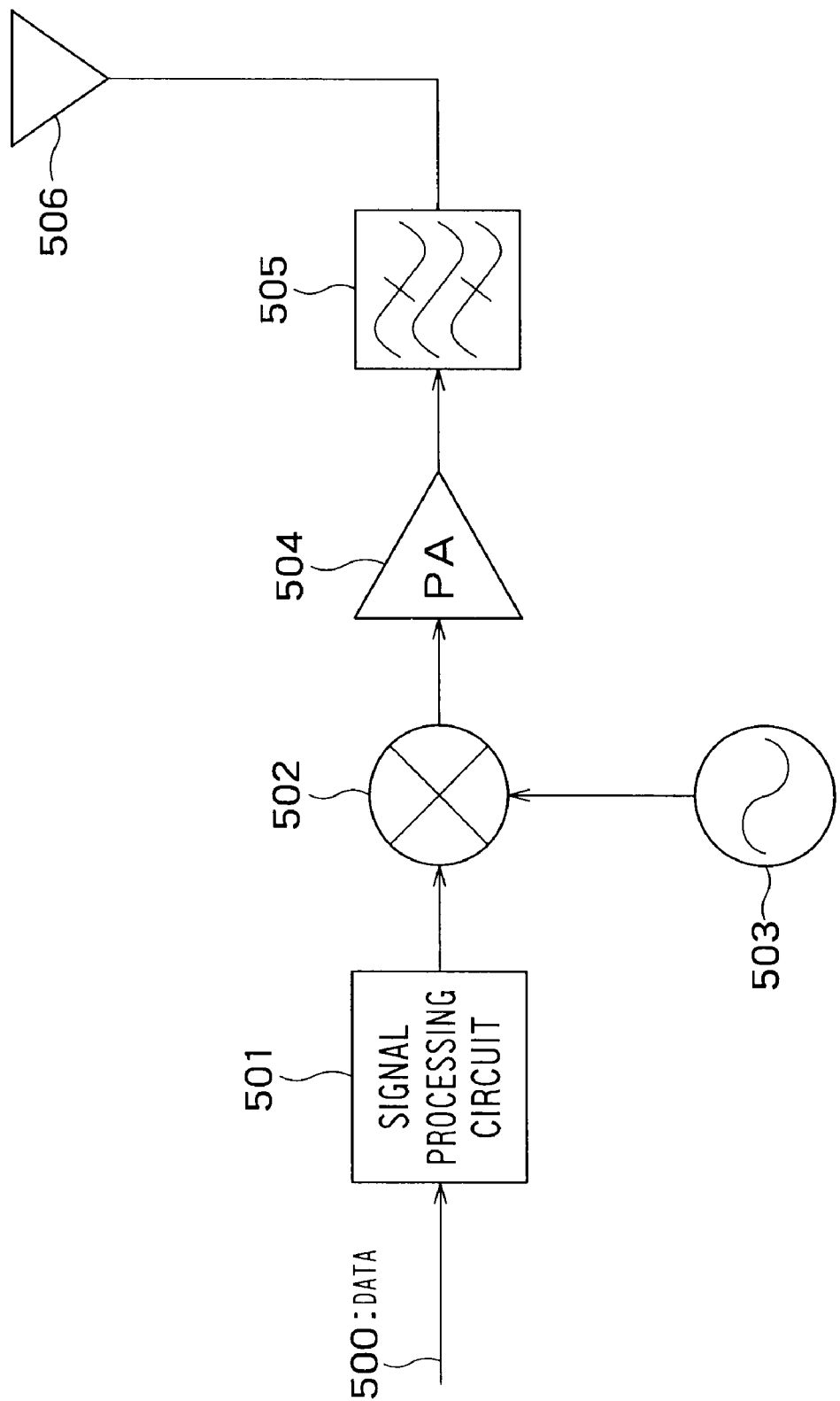
FIG. 21 is a constitutional view showing an example of radio communication equipment.

FIG. 21 shows an example of incorporating the filter circuit hitherto described into radio communication equipment, and schematically shows a transmission unit of the radio communication equipment.

Data 500 to be transmitted is inputted into a signal processing circuit 501, and subjected to processing such as digital-analog conversion, encoding, and modulation, thereby to generate a transmission signal in a base band or an intermediate frequency (IF) band. The generated transmission signal is inputted into a frequency converter (mixer) 502 by the signal processing circuit 501, and multiplied by a local signal from a local signal generator 503, to be frequency-converted to a signal in a radio frequency (RF) band, namely up-converted. The RF signal outputted from the mixer 502 is amplified by a power amplifier (PA) 504, and thereafter inputted into a band limiting filter (transmission filter) circuit 505 according to the present embodiment. The signal is subjected to band limitation in this filter circuit 505 for removal of an unnecessary frequency component, and thereafter, the signal is released as a radio wave from an antenna 506 into the space.

What is claimed is:

1. A filter circuit, comprising:
   an input terminal configured to input an input signal having a certain band;
   a first four-port element configured to receive said input signal at a terminal A, divide said input signal and transmit divided signals from a terminal B and a terminal C, respectively, combine signals received at said terminal B and said terminal C, and transmit a combined signal from a terminal D;
   a first band stop filter configured to have a stop band including a center frequency of said input signal, receive the divided signal transmitted from said terminal B, reflect a part of the divided signal transmitted from said terminal B at said stop band back to said terminal B while passing a remainder of the divided signal from said terminal B at a pass band outside said stop band, and including a resonator having a resonance frequency of a same value as that of said center frequency;
   a second band stop filter configured to have a stop band identical to said stop band of said first band stop filter, receive the divided signal from the terminal C, reflect back a part of the divided signal transmitted from said terminal C at said stop band while passing a remainder of the divided signal from said terminal C at said pass band, and including a resonator having a resonance frequency of said same value as that of said center frequency;
   a first resonator circuit configured to extract a signal in a desired band from the remainder of the divided signal from said terminal B which passed through said first band stop filter, with a use of a plurality of first resonators;
   a second resonator circuit configured to extract a signal in said desired band from the remainder of the divided signal from said terminal C which passed through said second band stop filter, with a use of a plurality of second resonators having a same resonance frequency as each of the first resonators;
   a second four-port element configured to receive, at a terminal E, the combined signal from the terminal D, divide the combined signal from the terminal D and transmit divided signals from a terminal F and a terminal G, respectively, and combine signals received at said terminal F and said terminal G, and transmit a combined signal from a terminal H;
   a third band stop filter configured to have a stop band identical to the stop band of said first band stop filter, pass a signal in said desired band extracted at said first resonator circuit to said terminal F, and reflect back a signal transmitted from said terminal F in said stop band;
   a fourth band stop filter configured to have a stop band identical to the stop band of said first band stop filter, pass a signal in said desired band extracted at said second resonator circuit to said terminal G, and reflect back a signal transmitted from said terminal G in said stop band;
   an output terminal configured to output the combined signal transmitted from the terminal H; and
   a resonator-coupled circuit placed on a transmission line from said terminal D of said first four-port element to said terminal E of said second four-port element, which couples the resonators of said first and second band stop filters with the resonators of said third and fourth band stop filters through said transmission line so as to release the resonance frequency degeneracy of the resonators of said first and second band stop filters, wherein said resonator-coupled circuit is a delay circuit at 90±45±180×n degrees and n is an integer equal to or greater than 0.

2. The filter circuit according to claim 1, further comprising:
a plurality of first isolators configured to allow a signal to pass in one direction from said first band stop filter to said first resonator circuit, and allow a signal to pass in one direction from said first resonator circuit to said third band stop filter, and to prevent coupling of the resonator of said first band stop filter with the resonator of said third band stop filter through said first resonator circuit; and
a plurality of second isolators configured to allow a signal to pass in one direction from said second band stop filter to said second resonator circuit, and allow a signal to pass in one direction from said second resonator circuit to said fourth band stop filter, and to prevent coupling of the resonator of said second band stop filter with the resonator of said fourth band stop filter through said second resonator circuit.

3. The filter circuit according to claim 1, wherein said first and second four-port elements are rat-race circuits, respectively.

4. The filter circuit according to claim 1, wherein said first and second resonator circuits are superconducting resonator circuits.

5. The filter circuit according to claim 1, wherein said first and second four-port elements are magic T elements, respectively.

6. A radio communication equipment comprising:
a signal processing circuit configured to perform transmission processing on transmission data to obtain a transmission signal;
a power amplifier configured to amplify said transmission signal;
a filter circuit configured to perform filter processing on an amplified signal; and
an antenna configured to radiate a signal from said filter circuit into space as a radio wave,
said filter circuit including
an input terminal configured to input a signal output from said power amplifier,
a first four-port element configured to receive an input signal at a terminal A, divide said input signal and transmit divided signals from a terminal B and a terminal C, respectively, combine signals received at said terminal B and said terminal C, and transmit a combined signal from a terminal D;
a first band stop filter configured to have a stop band including a center frequency of said input signal, receive the divided signal transmitted from said terminal B, reflect a part of the divided signal transmitted from said terminal B at said stop band back to said terminal B while passing a remainder of the divided signal from said terminal B at a pass band outside said stop band, and including a resonator having a resonance frequency of a same value as that of said center frequency;
a second band stop filter configured to have a stop band identical to said stop band of said first band stop filter, receive the divided signal from the terminal C, reflect back a part of the divided signal transmitted from said terminal C at said stop band while passing a remainder of the divided signal from said terminal C at said pass band, and including a resonator having a resonance frequency of said same value as that of said center frequency;
a first resonator circuit configured to extract a signal in a desired band from the remainder of the divided signal from said terminal B which passed through said first band stop filter, with a use of a plurality of first resonators;
a second resonator circuit configured to extract a signal in said desired band from the remainder of the divided signal from said terminal C which passed through said second band stop filter, with a use of a plurality of second resonators having a same resonance frequency as each of the first resonators;
a second four-port element configured to receive, at a terminal E, the combined signal from the terminal D, divide the combined signal from the terminal D and transmit divided signals from a terminal F and a terminal G, respectively, and combine signals received at said terminal F and said terminal G, and transmit a combined signal from a terminal H;
a third band stop filter configured to have a stop band identical to the stop band of said first band stop filter, pass a signal in said desired band extracted at said first resonator circuit to said terminal F, and reflect back a signal transmitted from said terminal F in said stop band;
a fourth band stop filter configured to have a stop band identical to the stop band of said first band stop filter, pass a signal in said desired band extracted at said second resonator circuit to said terminal G, and reflect back a signal transmitted from said terminal G in said stop band;
an output terminal configured to output the combined signal transmitted from the terminal H; and
a resonator-coupled circuit placed on a transmission line from said terminal D of said first four-port element to said terminal E of said second four-port element, which couples the resonators of said first and second band stop filters with the resonators of said third and fourth band stop filters through said transmission line so as to release the resonance frequency degeneracy of the resonators of said first and second band stop filters, wherein said resonator-coupled circuit is a delay circuit at 90±45±180×n degrees and n is an integer equal to or greater than 0.

7. The radio communication equipment according to claim 6, wherein said first and second four-port elements are magic T elements, respectively.

8. The radio communication equipment according to claim 6, wherein said filter circuit further includes
a plurality of first isolators configured to allow a signal to pass in one direction from said first band stop filter to said first resonator circuit, and allow a signal to pass in one direction from said first resonator circuit to said third band stop filter, and to prevent coupling of the resonator of said first band stop filter with the resonator of said third band stop filter through said first resonator circuit, and
a plurality of second isolators configured to allow a signal to pass in one direction from said second band stop filter to said second resonator circuit, and allow a signal to pass in one direction from said second resonator circuit to said fourth band stop filter, and to prevent coupling of the resonator of said second band stop filter with the resonator of said fourth band stop filter through said second resonator circuit.

9. The radio communication equipment according to claim 6, wherein said first and second four-port elements are rat-race circuits, respectively.

10. The radio communication equipment according to claim 6, wherein said first and second resonator circuits are superconducting resonator circuits.

* * * * *